United States Patent
Choi

(10) Patent No.: US 10,324,595 B2
(45) Date of Patent: Jun. 18, 2019

(54) DIGITAL DEVICE CONFIGURED TO CONNECT WITH PLURALITY OF OPERATION DEVICES AND METHOD OF DISPLAYING SECOND USER INTERFACE ASSOCIATED WITH SECOND OPERATION DEVICE IN RESPONSE TO DRAGGING OF FIRST USER INTERFACE ASSOCIATED WITH FIRST OPERATION DEVICE IN THE SAME

(71) Applicant: LG ELECTRONICS INC., Seoul (KR)

(72) Inventor: Kyungdong Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/721,443

(22) Filed: Sep. 29, 2017

(65) Prior Publication Data

US 2018/0095628 A1 Apr. 5, 2018

(30) Foreign Application Priority Data

Sep. 30, 2016 (KR) .................. 10-2016-0126426

(51) Int. Cl.
*G06F 3/14* (2006.01)
*G06F 3/16* (2006.01)
(Continued)

(52) U.S. Cl.
CPC .......... *G06F 3/0484* (2013.01); *G06F 3/0488* (2013.01); *G06F 3/14* (2013.01); *G06F 3/1423* (2013.01); *G06F 3/1454* (2013.01); *G09G 5/14* (2013.01); *H04N 21/42202* (2013.01); *H04N 21/42204* (2013.01); *H04N 21/4367* (2013.01); *G06F 3/167* (2013.01);
(Continued)

(58) Field of Classification Search
None
See application file for complete search history.

(56) References Cited

U.S. PATENT DOCUMENTS

2010/0286801 A1 11/2010 Yum et al.
2014/0087770 A1 3/2014 Cho et al.
(Continued)

OTHER PUBLICATIONS

PCT International Application No. PCT/KR2017/010309, Notification of Transmittal of the International Search Report and the Written Opinion of the International Searching Authority, or Declaration dated Jan. 11, 2018, 10 pages.

*Primary Examiner* — Asher D Kells
(74) *Attorney, Agent, or Firm* — Lee, Hong, Degerman, Kang & Waimey

(57) ABSTRACT

A digital device and a data processing method in the digital device are disclosed. The digital device comprises a memory; a communication unit for receiving a first control signal while a screen of the digital device is turned off, a controller connected with at least one or more operation devices in accordance with the first control signal, receiving data from the connected operation devices and controlling a first user interface including an indicator for the at least one or more operation devices to be displayed on a predetermined area within the screen of the display with reference to the received data, and a display unit including the screen for displaying the first user interface.

8 Claims, 22 Drawing Sheets

(51) Int. Cl.
　　　*G09G 5/14*　　　　(2006.01)
　　　*G06F 3/0484*　　(2013.01)
　　　*G06F 3/0488*　　(2013.01)
　　　*H04N 21/422*　　(2011.01)
　　　*H04N 21/4367*　(2011.01)

(52) U.S. Cl.
　　　CPC ... *G09G 2370/022* (2013.01); *G09G 2370/10* (2013.01); *G09G 2380/02* (2013.01)

(56) References Cited

U.S. PATENT DOCUMENTS

| | | | |
|---|---|---|---|
| 2014/0167931 A1* | 6/2014 | Lee | H04L 12/2818 340/12.5 |
| 2015/0264169 A1* | 9/2015 | Yim | H04M 1/72563 455/411 |
| 2016/0127675 A1 | 5/2016 | Ahn | |
| 2016/0147207 A1 | 5/2016 | Park et al. | |
| 2017/0220358 A1* | 8/2017 | VanBlon | H04L 49/9068 |

* cited by examiner (a)  (b)

(a)  (b)

(a)                    (b)

DIGITAL DEVICE CONFIGURED TO CONNECT WITH PLURALITY OF OPERATION DEVICES AND METHOD OF DISPLAYING SECOND USER INTERFACE ASSOCIATED WITH SECOND OPERATION DEVICE IN RESPONSE TO DRAGGING OF FIRST USER INTERFACE ASSOCIATED WITH FIRST OPERATION DEVICE IN THE SAME

CROSS-REFERENCE TO RELATED APPLICATION

Pursuant to 35 U.S.C. § 119(a), this application claims the benefit of earlier filing date and right of priority to Korean Patent Application No. 10-2016-0126426, filed on Sep. 30, 2016, the contents of which are all hereby incorporated by reference herein in its entirety.

BACKGROUND OF THE INVENTION

Field of the Invention

The present invention relates to digital device, and more particularly, to data communication between a control device of a plurality of digital devices and one or more operation devices connected with or capable of being connected with the control device.

Discussion of the Related Art

Recently, mobile devices such as a smart phone, a tablet PC, and a wearable device have been remarkably developed subsequently to the development of fixed devices such as a PC and a TV.

In accordance with a boom of digital convergence together with the development of the mobile devices, data communication between the mobile device and digital convergence and the development of technologies related to the data communication have been actively made. Recently, attention to IoT (Internet of Things) devices has been increased, and many attempts related to control of the IoT devices through a home network have been made.

However, the standard of data communication between a plurality of devices including the IoT devices is still incomplete, and users experience inconvenience due to considerations or obstacles such as network environment and operation state of each device. For this reason, the data communication is not actively used.

The present specification discloses a digital device and a data processing method in the same to solve the aforementioned problem and other problems.

An object of the present invention is to provide active data communication between a plurality of digital devices.

Another object of the present invention is to intuitively and easily enable data communication and control between a main device (control device) of a plurality of digital devices and a sub device (operation device(s)).

The technical objects that can be achieved through the present invention are not limited to what has been particularly described hereinabove and other technical objects not described herein will be more clearly understood by persons skilled in the art from the following detailed description.

SUMMARY OF THE INVENTION

The present specification discloses various embodiments related to a digital device and a data processing method in the digital device.

An example of a digital device according to one embodiment of the present invention comprises a memory; a communication unit for receiving a first control signal while a screen of the digital device is turned off; a controller connected with at least one or more operation devices in accordance with the first control signal, receiving data from the connected operation devices and controlling a first user interface including an indicator for the at least one or more operation devices to be displayed on a predetermined area within the screen of the display with reference to the received data; and a display unit including the screen for displaying the first user interface.

The above technical solutions are merely some parts of the embodiments of the present invention and various embodiments into which the technical features of the present invention are incorporated can be derived and understood by persons skilled in the art from the following detailed description of the present invention.

Advantageous effects of the present invention are as follows.

According to one of various embodiments of the present invention, data communication may actively be performed between a plurality of digital devices.

According to one of various embodiments of the present invention, data communication and control may be performed intuitively and easily between a main device (control device) of a plurality of digital devices and a sub device (operation device(s)).

The effects that can be achieved through the present invention are not limited to what has been particularly described hereinabove and other effects not described herein will be more clearly understood by persons skilled in the art from the following detailed description.

DETAILED DESCRIPTION OF THE INVENTION

Description will now be given in detail according to various embodiment(s) for a digital device and data processing method therein disclosed herein, with reference to the accompanying drawings.

Suffixes such as "module", "unit" and the like in this disclosure may be used to refer to elements or components. Use of such a suffix herein is merely intended to facilitate description of the specification, and both suffixes may be interchangeably usable. The description with ordinal numbers such as 'first ~', 'second ~' and the like is provided to facilitate the description of the corresponding terminologies only, which is non-limited by such terminologies or ordinal numbers. Although terminologies used in the present specification are selected from general terminologies used currently and widely in consideration of functions in the present invention, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the invention. Therefore, terminologies used in the present specification need to be construed based on the substantial meanings of the corresponding terminologies and the overall matters disclosed in the present specification rather than construed as simple names of the terminologies.

Meanwhile, the descriptions disclosed in the present specification and/or drawings correspond to one preferred embodiment of the present invention and are non-limited by the preferred embodiment. And, the scope/extent of the right should be determined through the appended claims.

Figure 2:
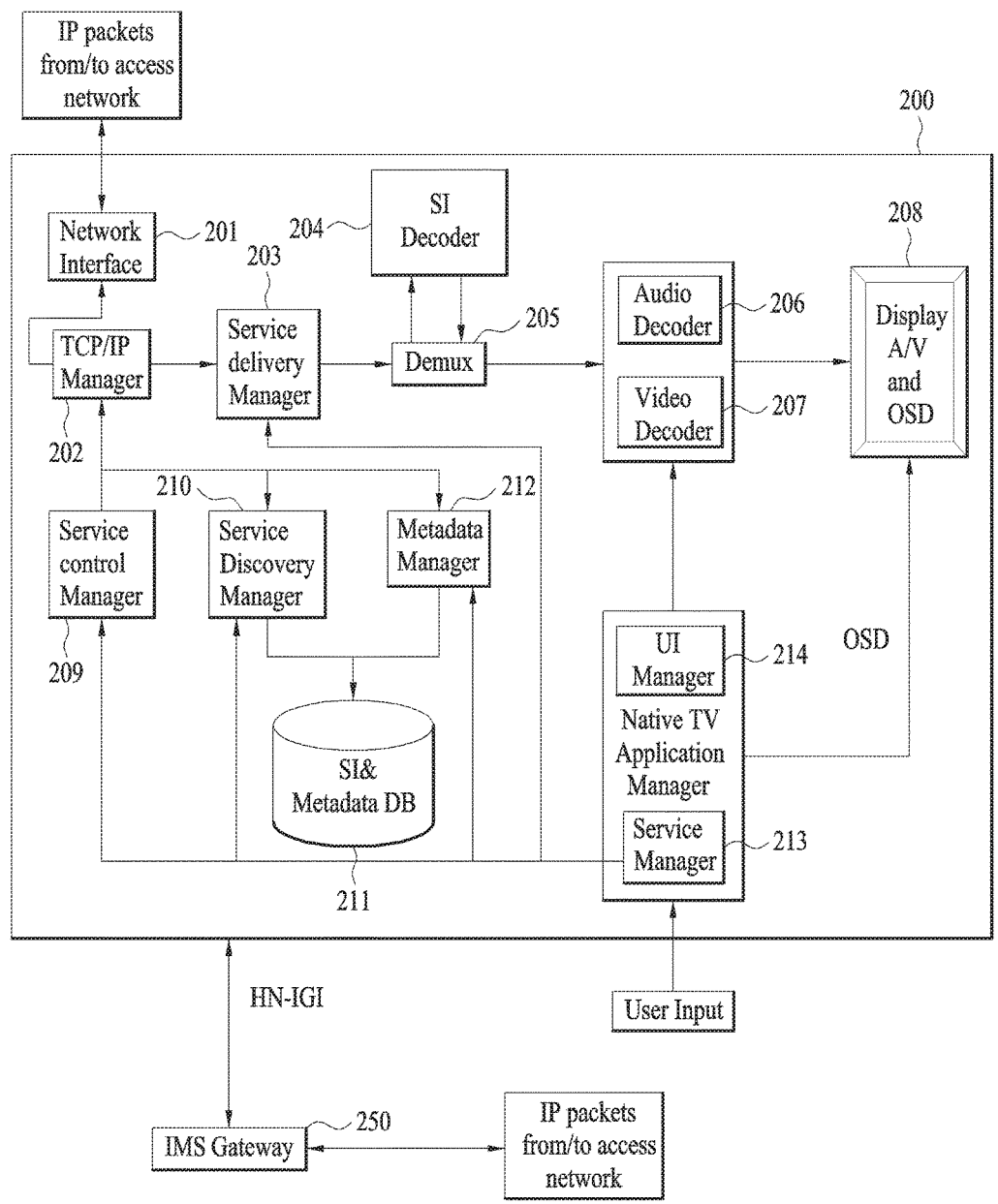
FIG. 2 is a block diagram illustrating a digital device according to one embodiment of the present invention.
Figure 3:
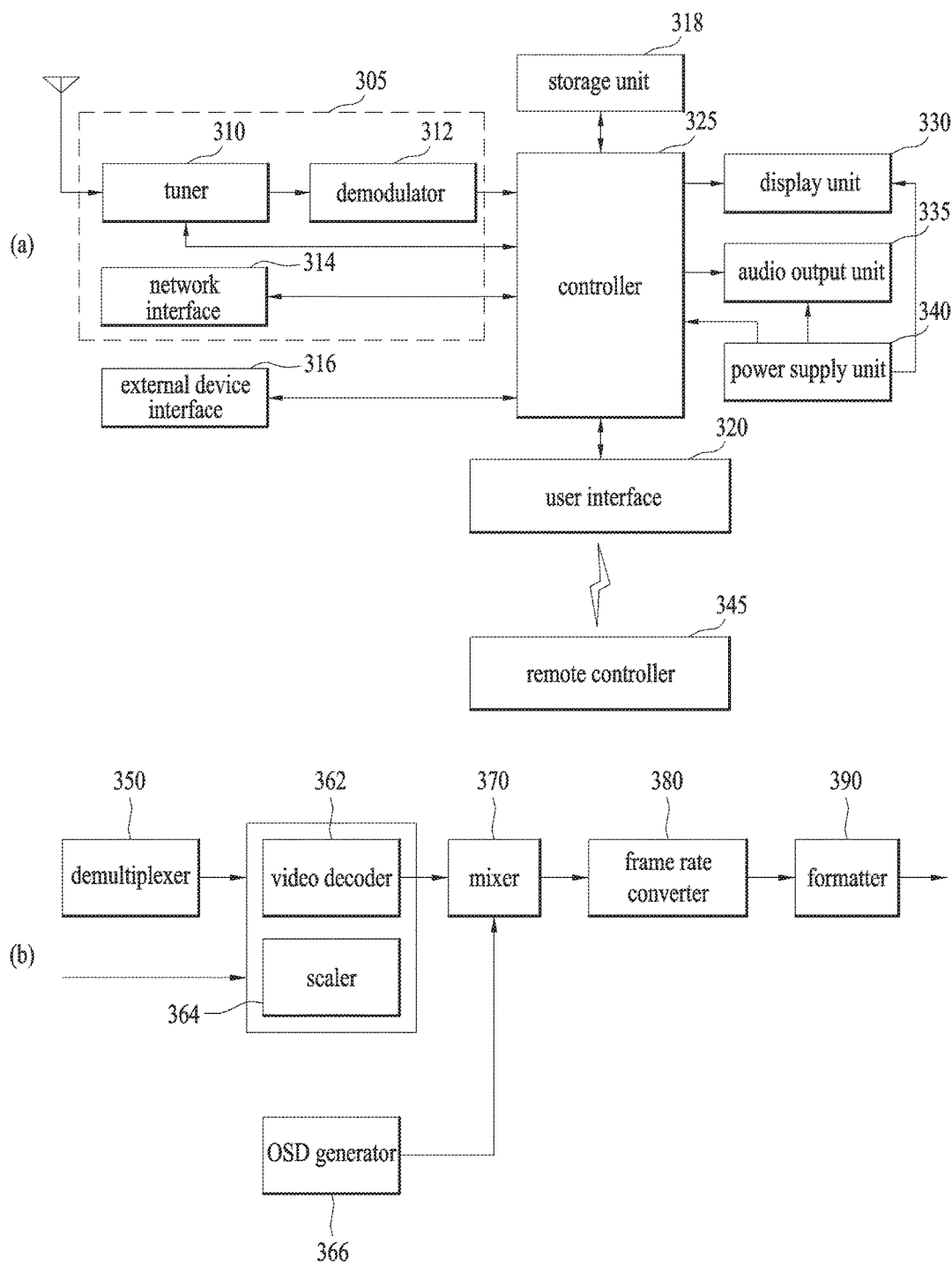
FIG. 3 is a block diagram illustrating other configuration or a detailed configuration of FIG. 2.
Figure 4:
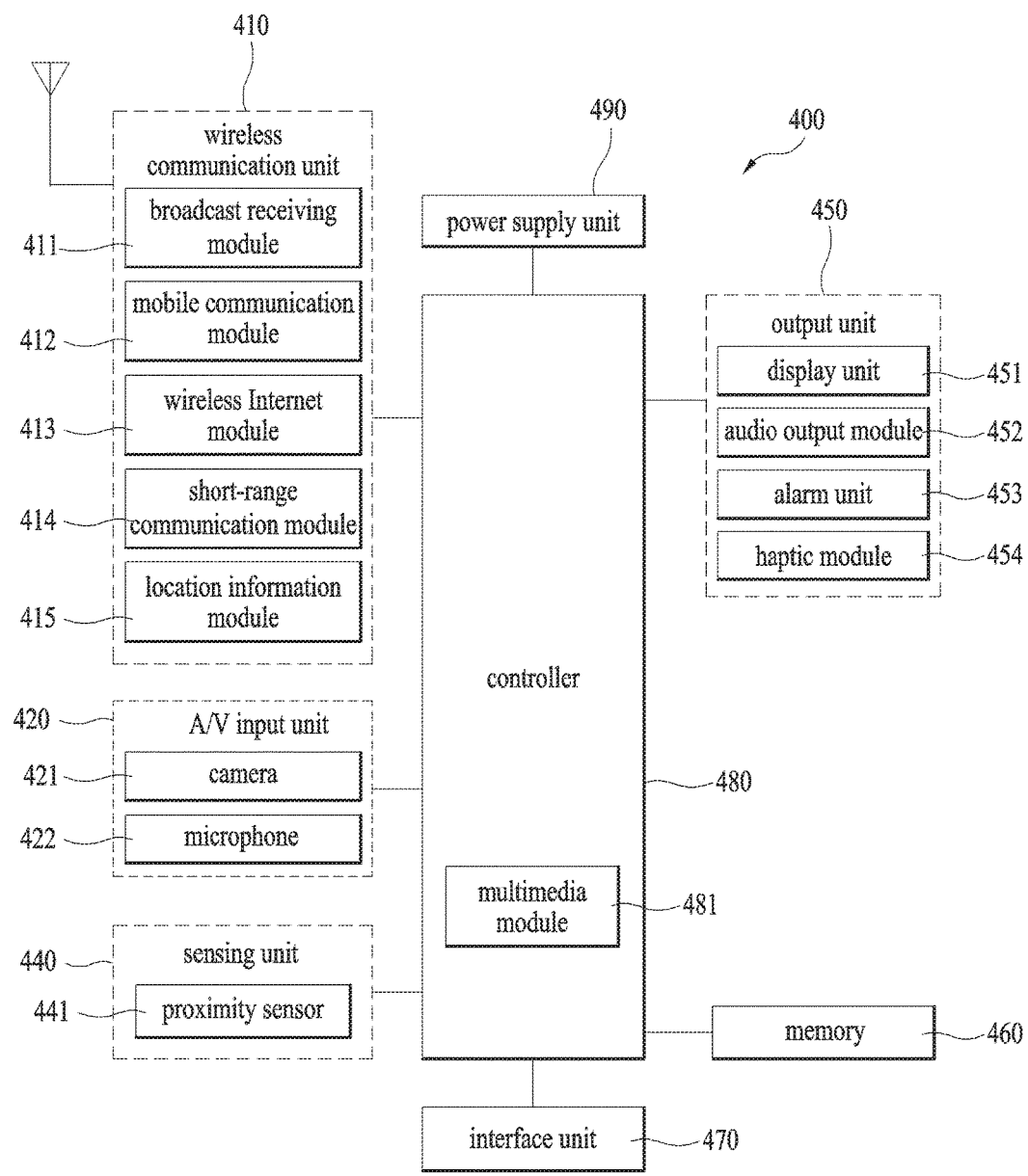
FIG. 4 is a block diagram illustrating an external device according to one embodiment of the present invention.
Figure 5:
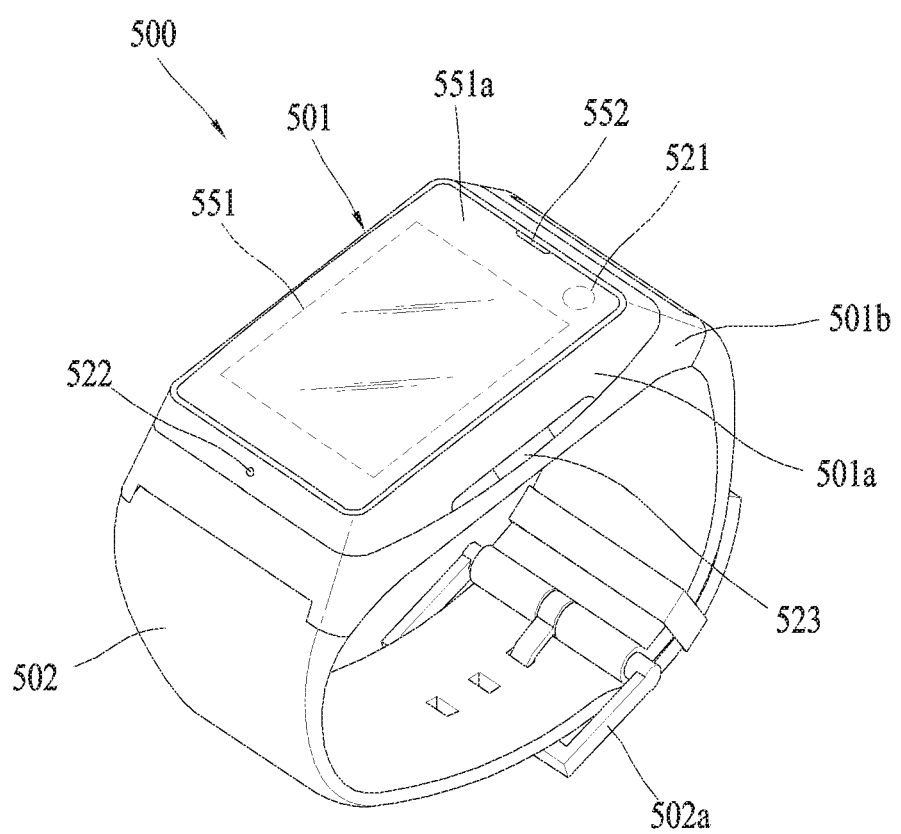
FIG. 5 is a block diagram illustrating a digital device or an external device according to another embodiment of the present invention.

'Digital device' described in the present specification includes any device capable of performing at least one of transmission, reception, processing and output of contents for example. The digital device can receive the content or information on the content by streaming or download through a server (e.g., a broadcasting station), an external input or the like. The digital device may transmit/receive data including the content to/from the server or the like through a wire/wireless network. The digital device may include one of a fixed (or standing) device and a mobile device. The standing devices may include Network TV, HBBTV (Hybrid Broadcast Broadband TV), Smart TV, IPTV (Internet Protocol TV), PC (Personal Computer), etc. And, the mobile devices may include PDA (Personal Digital Assistant), Smart Phone, Tablet PC, Notebook, Digital Broadcast Terminal, PMP (portable multimedia player), Navigation, Slate PC, Ultrabook, Wearable Device (e.g., watch type terminal, glass type terminal, HMD (head mounted display), etc. In the following, for examples of digital devices, FIG. 2 and FIG. 3 show a digital TV as one of the standing devices and FIG. 4 and FIG. 5 show a mobile terminal and a wearable device (e.g., a smart watch) as the mobile devices, respectively.

And, such digital devices shall be described in detail for the corresponding parts. If the digital device is the standing device, it may have include a signage having a display panel only or a SET type with another configuration such as a set-top box (STB) and the like.

In the above description, the wire/wireless network described in the present specification includes all hardware and/or software for a connection, pairing, data communication and the like between a server and a digital device, and also includes all networks supported currently or all networks that will be supported in the future, by Standards. The wire/wireless network is capable of supporting one or more communication protocols for data communications. Such wire/wireless networks can be established by a network for a wire connection and a communication specification or protocol for the same (e.g., USB (Universal Serial Bus), CVBS (Composite Video Banking Sync), Component, S-video (analog), DVI (Digital Visual Interface), HDMI (High Definition Multimedia Interface), RGB, D-SUB, etc.) and a network for a wireless connection and a communication specification or protocol (e.g., Bluetooth, RFID (Radio Frequency Identification), IrDA (infrared Data Association), UWB (Ultra Wideband), ZigBee, DLNA (Digital Living Network Alliance), WLAN (Wireless LAN)(Wi-Fi), Wibro (Wireless broadband), Wimax (World Interoperability for Microwave Access), HSDPA (High Speed Downlink Packet Access), LTE/LTE-A (Long Term Evolution/LTE-Advanced), Wi-Fi direct).

Besides, a digital device may use a universal OS (operating system), a Web OS and the like. Hence, the digital device can process adding, deleting, amending, updating and the like of various services or applications on Universal OS kernel or Linux kernel, through which a further user-friendly environment can be configured and provided.

A digital device according to one embodiment of the present invention includes a communication interface unit communicating with one or more peripheral devices, a display unit, and a controller configured to form a connectivity manager including information on one or more connectible peripheral devices and display the connectivity manager on a screen, the controller configured to if the information on at least one peripheral device on the displayed connectivity manager is selected, connect to a first peripheral device by sending a first control signal, the controller configured to receive first data from the connected first peripheral device and display the received first data on the screen, wherein if the connectivity manager is called and information on a second peripheral device is selected, the controller is further configured to connect to the second peripheral device by sending a second control signal and transmit the first data to the connected second peripheral device.

Figure 1:
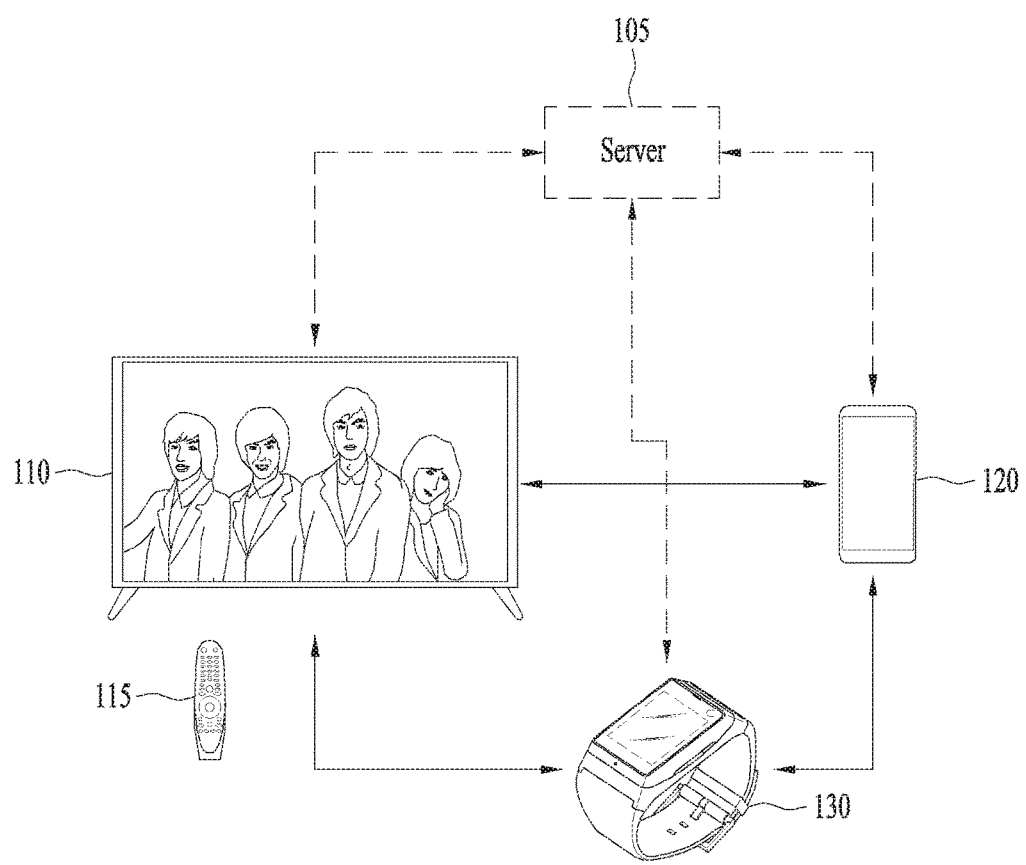
FIG. 1 is a diagram briefly illustrating a service system according to one embodiment of the present invention.

FIG. 1 is a schematic diagram illustrating a service system according to one embodiment of the present invention.

Referring to FIG. 1, a service system may be implemented by including a plurality of digital devices 110, 120 and 130 capable of performing data communications by communicating with each other. Herein, for the communications or data communications among a plurality of the digital devices 110, 120 and 130 or for at least one of a plurality of the digital devices 110, 120 and 130, a server 105 may be further included in the service system. Meanwhile, in some cases, the server 105 may include one of various processors or devices such as a gateway, a relay, a gap filler, a communication relay and the like and perform functions with them.

Meanwhile, although the digital TV 110, the smartphone 120 and the smartwatch 130 are illustrated as the digital devices, various devices such as a camera, a keyboard, a headset, a sound bar, a speaker, a printer (e.g., pocket photo), a vehicle, an air conditioner, a refrigerator, an electric cooker, an electric cleaner (or robot cleaner) and the like can be included in the digital devise in association with the present invention. Meanwhile, at least one digital device (named 'main device' hereinafter) among a plurality of the digital devices can control the rest of the digital device(s) (named 'peripheral device(s)'). Data communications between the main device and the peripheral device(s), particular control processes and the like shall be described in detail later.

With reference to FIGS. 2 to 5, configuration block diagrams of the digital devices shown in FIG. 1 are described for example. FIGS. 2 to 5 in the following may include configuration block diagrams of the aforementioned main or peripheral devices. Meanwhile, in the present invention, a main/peripheral device may include a single device or a plurality of devices. So to speak, it is able to control at least one peripheral device using at least one main device.

FIG. 2 is a block diagram showing a digital TV according to one embodiment of the present invention.

In the following, referring to FIG. 2, the digital TV 200 may include a network interface 201, a TCP/IP manager 202, a service delivery manager 203, an SI decoder 204, a demuxer or demultiplexer 205, an audio decoder 206, a video decoder 207, a display A/V and OSD (On Screen Display) module 208, a service control manager 209, a service discovery manager 210, a SI & metadata database (DB) 211, a metadata manager 212, a service manager 213, a UI manager 214, etc.

The network interface 201 may transmit/receive IP (internet protocol) packet(s) or IP datagram(s) (hereinafter named IP pack(s)) to/from the server 105 through a network. For instance, the network interface 201 may receive services, applications, contents, broadcast programs and the like from the server 105 shown in FIG. 1 via such a medium as terrestrial, cable, satellite, IP and the like through a network.

The TCP/IP manager 202 may involve delivery of IP packets transmitted to the digital TV 200 and IP packets transmitted from the digital TV 200, that is, packet delivery between a source and a destination. The TCP/IP manager 202 may classify received packet(s) according to an appropriate protocol and output the classified packet(s) to the service delivery manager 205, the service discovery manager 210, the service control manager 209, the metadata manager 212, and the like.

The service delivery manager 203 may be in charge of controlling the received service data. The service delivery manager 203 may control real-time streaming data, for example, using RTP/RTCP. In case of transmitting the real-time streaming data using RTP, the service delivery manager 203 may parse the received data packet according to the RTP and then transmits the parsed data packet to the demultiplexer 205 or save the parsed data packet to the SI & metadata DB 211 under the control of the service manager 213. The service delivery manager 203 may feed back the network reception information to the service providing server side using RTCP.

The demultiplexer 205 may demultiplex a received packet into audio data, video data, SI (System Information/Service Information/Signaling Information) data and the like and then transmit the demultiplexed data to the audio/video decoder 206/207 and the SI decoder 204, respectively.

The SI decoder 204 may decode the demultiplexed SI data, i.e., service informations of PSI (Program Specific Information), PSIP (Program and System Information Protocol), DVB-SI (Digital Video Broadcasting-Service Information), DTMB/CMMB (Digital Television Terrestrial Multimedia Broadcasting/Coding Mobile Multimedia Broadcasting), etc. And, the SI decoder 204 may save the decoded service informations to the SI & metadata DB 211.

The saved service information can be used by being read by a corresponding component in response to a user's request for example.

The audio decoder 206 and the video decoder 207 may decode the demultiplexed audio data and the demultiplexed video data, respectively. The decoded audio and video data may be provided to the user through the display unit 208.

The application manager includes a service manager 213 and a user interface (UI) manager 214 and is able to perform a function of a controller of the digital TV 200. So to speak, the application manager can administrate the overall states of the digital TV 200, provide a user interface (UI), and manage other mangers.

The UI manager 214 provides a graphical user interface/user interface (GUI/UI) using OSD (on screen display) and the like. The UI manager 214 receives a key input from a user and then performs a device operation according to the input. For instance, if receiving a key input about a channel selection from a user, the UI manager 214 transmits the key input signal to the service manager 213.

The service manager 213 may control and manage service-related managers such as the service delivery manager 203, the service discovery manager 210, the service control manager 209, and the metadata manager 212. The service manager 213 creates a channel map and controls a selection of a channel and the like using the created channel map in response to a key input received from the UI manager 214. The service manager 213 may receive service information from the SI decoder 204 and then sets an audio/video PID of a selected channel for the demultiplexer 205. Such a PID can be used for the demultiplexing procedure. Therefore, the demultiplexer 205 performs filtering (PID or section filtering) on audio data, video data and SI data using the PID.

The service discovery manager 210 may provide information required to select a service provider that provides a service. Upon receipt of a signal for selecting a channel from the service manager 213, the service discovery manager 210 searches for a service using the information.

The service control manager 209 may select and control a service. For example, the service control manager 209 may perform service selection and control using IGMP (Internet Group Management Protocol) or real time streaming protocol (RTSP) when the user selects a live broadcast service and using RTSP when the user selects a video on demand (VOD) service. The RTSP protocol can provide a trick mode for real-time streaming. And, the service control manager 209 may initialize and manage a session through the IMS gateway 250 using IMS (IP multimedia subsystem) and SIP (session initiation protocol). The protocols are exemplary, and other protocols are usable according to implementations.

The metadata manager 212 may manage metadata associated with services and save the metadata to the SI & metadata DB 211.

The SI & metadata DB 211 may store service information decoded by the SI decoder 204, metadata managed by the metadata manager 212, and information required to select a service provider, which is provided by the service discovery manager 210. In addition, the SI & metadata DB 211 can store system set-up data and the like for the system. The SI & metadata database 211 may be implemented with non-volatile RAM (NVRAM), flash memory and the like.

Meanwhile, an IMS gateway 250 is a gateway in which functions required for an access to an IMS based IPTV service are collected.

In FIG. 2, the network interface 201, at least one configuration of the application manager, a user interface 320 to be described in FIG. 3, one configuration of a wireless communication unit 410 or an interface 470 to be mentioned in FIG. 4, one configuration mentioned in FIG. 5 and the like may provide interfaces for communications or data communications with a user, other digital devices and the like and exchange data including control data with each other.

FIG. 3 is a block diagram showing another configuration or detailed configuration of FIG. 2.

Referring to FIG. 3 (a), a digital TV may include a broadcast receiving unit 305, an external device interface 316, a storage unit 318, a user interface 320, a controller 325, a display unit 330, an audio output unit 335, a power supply unit 340, and a photographing unit (not shown). Herein, the broadcast receiving unit 305 may include at least one of one tuner 310, a demodulator 312, and a network interface 314. Yet, in some cases, the broadcast receiving unit 305 may include the tuner 310 and the demodulator 312 without the network interface 314, or may include the network interface 314 without the tuner 310 and the demodulator 312. The broadcast receiving unit 305 may include a multiplexer (not shown) to multiplex a signal, which is subjected to the tuner 310 and demodulated by the demodulator 312, and a signal received through the network interface 314. In addition, the broadcast receiving unit 305 can include a demultiplexer (not shown) and demultiplex the multiplexed signal, the demodulated signal, or a signal received through the network interface 314.

The tuner 310 may receive a radio frequency (RF) broadcast signal by tuning in to a channel selected by the user or all previously stored channels among RF broadcast signals received through an antenna. And, the tuner 310 converts the received RF broadcast signal into an IF (intermediate frequency) signal or a baseband signal. For instance, if a received RF broadcast signal is a digital broadcast signal, it is converted into a digital IF (DIF) signal. If a received RF broadcast signal is an analog signal, it is converted into an analog baseband video/audio signal (CVBS/SIF). Namely, the tuner 310 is able to process both of the digital broadcast signal and the analog signal. The analog baseband video/audio signal (CVBS/SIF) outputted from the tuner 310 may be directly inputted to the controller 325. The tuner 310 may receive an RF broadcast signal of a single carrier or multiple carriers. The tuner 310 sequentially tunes in to and receives RF broadcast signals of all broadcast channels stored through the channel memory function among RF broadcast signals received through the antenna and is then able to convert it into an intermedia frequency signal or a baseband signal (DIF: digital intermediate frequency or baseband signal).

The demodulator 312 receives and demodulates the digital IF signal (DIF) converted by the tuner 310 and is then able to channel decoding and the like. To this end, the demodulator 312 may include a Trellis decoder, a de-interleaver, a Reed-Solomon decoder and the like, or may include a convolution decoder, a de-interleaver, a Reed-Solomon decoder and the like. The demodulator 312 performs demodulation and channel decoding and is then able to output a stream signal TS (transport stream). In this case, the stream signal may include a signal of multiplexing a video signal, an audio signal and/or a data signal. For instance, the stream signal may include MPEG-2 TS (transport stream) in which a video signal of PMEG-2 and an audio signal of Dolby AC-3 are multiplexed. The stream signal outputted from the demodulator 312 may be inputted to the controller 325. The controller 325 can control demultiplexing, audio/video signal processing, etc. Furthermore, the controller 325 can control outputs of video and audio through the display 330 and the audio output unit 335, respectively.

The external device interface 316 may provide an interfacing environment between the digital device 300 and various external devices. To this end, the external device interface 316 may include an A/V input/output unit (not shown) or a wireless communication unit (not shown). The external device interface 316 can be connected with external devices such as a digital versatile disk (DVD), a Blu-ray player, a game device, a camera, a camcorder, a computer (notebook computer), a tablet PC, a smartphone, a cloud and the like by wire/wireless. The external device interface 316 delivers a signal containing data such as an image, a video, an audio and the like, which is inputted through the connected external device, to the controller 325 of the digital TV. The controller 325 may control a data signal of the processed image, video and audio and the like to be outputted to the connected external device. To this end, the external device interface 316 may further include an A/V input/output unit (not shown) or a wireless communication unit (not shown).

In order to input video and audio signals of an external device to the digital TV, the A/V input/output unit may include a USB (Universal Serial Bus) terminal, a composite video banking sync (CVBS) terminal, a component terminal, an S-video terminal (analog), a digital visual interface (DVI) terminal, a high definition multimedia interface (HDMI) terminal, an RGB terminal, a D-SUB terminal, etc.

The wireless communication unit can perform short-range wireless communication with another digital device. The digital TV may be networked with other digital devices by communication protocols such as Bluetooth, radio frequency identification (RFID), infrared data association (IrDA), ultra wideband (UWB), ZigBee, and digital living network alliance (DLNA), etc. for example.

Moreover, the external device interface 316 may perform input/output operations with a set-top box (STB) by being connected thereto through at least one of the aforementioned terminals. Meanwhile, the external device interface 316 may receive an application or an application list within an adjacent external device and then forward it to the controller 325 or the storage unit 318.

The network interface 314 may provide an interface for connecting the digital TV to wired/wireless networks including Internet network. The network interface 314 may have Ethernet terminal and the like for an access to a wired network for example. For the access to the wireless network, the network interface 314 may use communication specifications such as WLAN (Wireless LAN) (Wi-Fi), Wibro (Wireless broadband), Wimax (World Interoperability for Microwave Access), HSDPA (High Speed Downlink Packet Access), etc. The network interface 314 may transceive data with another user or another digital device through the accessed network or another network linked to the accessed network. Particularly, the network interface 314 may send a portion of the content data stored in the digital TV to a user/digital device selected from other users/digital devices previously registered at the digital TV. Meanwhile, the network interface 314 may access a prescribed webpage through the accessed network or another network linked to the accessed network. Namely, the network interface 314 accesses a prescribed webpage through a network and is then able to transceive data with a corresponding server. Besides, the network interface 314 can receive contents or data provided by a content provider or a network operator. Namely, the network interface 314 may receive contents (e.g., movie, advertisement, game, VOD, broadcast signal, etc.) provided by the content provider or a network provider and information associated with the contents through the network.

The network interface 314 may receive update information and file of firmware provided by the network operator.

And, the network interface 314 may send data to the internet or content provider or the network operator. Moreover, the network interface 314 may select a desired application from open applications and receive it through a network.

The storage unit 318 may store programs for various signal processing and controls within the controller 325, and may also store a processed video, audio or data signal. In addition, the storage unit 318 may execute a function of temporarily storing a video, audio or data signal inputted from the external device interface 316 or the network interface 314. The storage unit 318 may store information on a prescribed broadcast channel through a channel memory function. The storage unit 318 may store an application or an application list inputted from the external device interface 316 or the network interface 314. And, the storage unit 318 may store various platforms which will be described later. The storage unit 318 may include storage media of one or more types, such as a flash memory type, a hard disk type, a multimedia card micro type, a card type memory (e.g. SD or XD memory), RAM, EEPROM, etc. The digital TV may play content files (a video file, a still image file, a music file, a text file, an application file, etc.) stored in the storage unit 318 and provide them to the user. FIG. 3 (*a*) illustrates an embodiment in which the storage unit 318 is separated from the controller 325, by which the present invention is non-limited. In other words, the storage unit 318 may be included in the controller 325.

The user interface 320 may forward a signal inputted by a user to the controller 325 or forward a signal outputted from the controller 325 to the user. For example, the user input interface 320 may receive control signals for power on/off, channel selection, screen settings and the like from a remote control device 345, or transmit control signals of the controller 325 to the remote control device 345, according to various communication schemes such as RF communication, IR communication, and the like. The user interface 320 can forward control signals inputted through a power key, a channel key, a volume key, and a local key (not shown) for a setup value or the like to the controller 325. The user interface 320 may forward a control signal inputted from a sensing unit (not shown) sensing a gesture of a user to the controller 325 or transmit a signal of the controller 325 to the sensing unit (not shown). Here, the sensing unit (not shown) may include a touch sensor, a voice sensor, a location sensor, an action sensor, etc.

The controller 325 may generate and output a signal for a video or audio output by demultiplexing a stream inputted through the tuner 310, the demodulator 312 or the external device interface 316 or processing demultiplexed signals. A video signal processed by the controller 325 can be inputted to the display unit 380 and displayed as an image corresponding to the video signal. In addition, the video signal video-processed by the controller 325 can be inputted to an external output device through the external device interface 316. An audio signal processed by the controller 325 can be audio-outputted to the audio output unit 335. Moreover, the audio signal processed by the controller 325 can be inputted to the external output device through the external device interface 316. The controller 325 may include a demultiplexer, an image processor, and the like, which are not shown in FIG. 3 (*a*). The controller 325 can control the overall operations of the digital TV. For example, the controller 325 can control the tuner 310 to tune in to an RF broadcast corresponding to a channel selected by a user or a previously stored channel. The controller 325 can control the digital TV according to a user command input through the user input interface 320 or an internal program. Particularly, the controller 325 can control the digital TV to access a network to download an application or an application list desired by a user to the digital TV. For example, the controller 325 may control the tuner 310 to receive a signal of a channel selected in response to a prescribed channel selection command received through the user input interface 320. And, the controller 325 may process a video, audio or data signal of the selected channel. The controller 325 may control information on a channel selected by the user to be outputted together with a processed video or audio signal through the display unit 330 or the audio output unit 335. For another example, the controller 325 may control a video signal or an audio signal, which is inputted through the external device interface unit 316 from an external device (e.g., a camera or a camcorder), to be outputted through the display unit 330 or the audio output unit 335 in response to an external device image play command received through the user input interface 320. Meanwhile, the controller 325 can control the display unit 330 to display a video. For example, the controller 325 can control a broadcast video inputted through the tuner 310, an external input video inputted through the external device interface 316, a video inputted through the network interface 430, or a video stored in the storage unit 440 to be displayed on the display unit 330. Here, the video displayed on the display unit 330 may include a still image or moving images or may include a 2D or 3D video. The controller 325 may control a content to be played. Here, the content may include a content stored in the digital TV, a received broadcast content, or a content inputted externally. The content may include at least one of a broadcast video, an external input video, an audio file, a still image, an accessed web screen, and a document file. The controller 325 may control an application or an application list, which is located in the digital device 300 or downloadable from an external network, to be displayed when an application view menu is entered. The controller 325 may control installation and execution of applications downloaded from an external network together with various user interfaces. Moreover, the controller 325 can control a video related to a launched application to be displayed on the display unit 330 by a user's selection.

Meanwhile, a channel browsing processor (not shown) configured to generate a thumbnail image corresponding to a channel signal or an external input signal may be further included. The channel browsing processor may receive an input of a stream signal (TS) outputted from the demodulator 312 or an input of a stream signal outputted from the external device interface 316, extract a video from the inputted stream signal, and then generate a thumbnail image.

The generated thumbnail image can be directly inputted to the controller 325 or may be inputted to the controller 325 by being encoded.

Moreover, the generated thumbnail image may be encoded into a stream and then inputted to the controller 325. The controller 325 may display a thumbnail list including a plurality of thumbnail images on the display unit 330 using the inputted thumbnail images. The thumbnail images included in the thumbnail list can be updated sequentially or simultaneously. Accordingly, the user can conveniently check content of a plurality of broadcast channels.

The display unit 330 may convert each of a video signal, a data signal, and an OSD signal processed by the controller 325 or each of a video signal and a data signal received from the external device interface 316 into R, G and B signals to generate a drive signals. The display unit 330 may include PDP (Plasma Display Panel), LCD (Liquid Crystal Display), OLED (Organic Light Emitting Diode), a flexible display, a 3D display, or the like. The display unit 330 may be configured as a touchscreen and used as an input device as well as an output device. The audio output unit 335 receives a signal audio-processed by the controller 325, for example, a stereo signal, a 3.1 channel signal or a 5.1 channel signal, and then outputs the received signal as audio. The audio output unit 335 may be configured as one of speakers of various types.

Meanwhile, the digital TV may further include the sensing unit (not shown) for sensing a gesture of the user, which includes at least one of a touch sensor, a voice sensor, a location sensor, and an action sensor, as described above. A signal sensed by the sensing unit (not shown) can be delivered to the controller 325 through the user input interface 320. The digital TV may further include a photographing unit (not shown) for photographing a user. Image information acquired by the photographing unit (not shown) can be inputted to the controller 325. The controller 325 may sense a gesture of a user from an image captured by the photographing unit (not shown) or a signal sensed by the sensing unit (not shown), or by combining the image and the signal.

The power supply unit 340 may supply a corresponding power to the digital TV overall. Particularly, the power supply unit 340 can supply the power to the controller 325 configurable as a system-on-chip (SoC), the display unit 330 for a video display, and the audio output unit 335 for an audio output. To this end, the power supply unit 340 may include a converter (not shown) configured to convert an AC power to a DC power. Meanwhile, for example, if the display unit 330 is configured as an LCD panel having a multitude of backlight lamps, the power supply unit 340 may further include an inverter (not shown) capable of PWM (pulse width modulation) operation for luminance variation or dimming drive.

The remote control device 345 sends a user input to the user input interface 320. To this end, the remote control device 345 can use Bluetooth, RF communication, IR communication, UWB, ZigBee, etc. In addition, the remote control device 345 can receive audio, video or data signal outputted from the user input interface 320 and then display the received signal or output the same as audio or vibration.

Regarding the digital device according to the present invention, some of the illustrated components may be omitted or new components (not shown) may be further added as required. On the other hand, the digital device may not include the tuner and the demodulator, differently from the aforementioned digital device, and may play a content by receiving the content through the network interface or the external device interface.

Referring to FIG. 3 (b), one example of the controller may include a demultiplexer 350, a video processor, an OSD generator 366, a mixer 370, a frame rate converter (FRC) 380, and a formatter 390. Besides, the controller may further include an audio processor and a data processor (not shown).

The demultiplexer 350 demultiplexes an inputted stream. For instance, the demultiplexer 350 can demultiplex an inputted stream signal into an MPEG-2 TS video, audio and data signals. Herein, the stream signal inputted to the demultiplexer may include a stream signal outputted from the tuner, demodulator or external device interface.

The video processor performs a video processing of the demultiplexed video signal. To this end, the video processor may include a video decoder 362 and a scaler 364. The video decoder 362 can decode the demultiplexed video signal, and the scaler 364 can scale the resolution of the decoded video signal to be outputtable from the display. The video decoder 362 can support various specifications. For instance, the video decoder 362 performs a function of MPEG-2 decoder if a video signal is encoded by MPEG-2. And, the video decoder 364 performs a function of H.264 decoder if a video signal is encoded by DMB (digital multimedia broadcasting) or H.264. Meanwhile, the video signal decoded by the image processor is inputted to the mixer 370.

The OSD generator 366 may generate OSD data according to a user input or by itself. For example, the OSD generator 366 may generate data to be displayed on the screen of the display 380 in the graphic or text form on the basis of a control signal of a user input interface. The generated OSD data may include various data such as a user interface screen of the digital device, various menu screens, widgets, icons, viewing rate information and the like. The OSD generator 366 can generate data to display a caption of a broadcast video or EPG based broadcast information.

The mixer 370 mixes the OSD data generated by the OSD generator 366 and the video signal processed by the video processor. The mixer 370 then provides the mixed signal to the formatter 390. By mixing the decoded video signal and the OSD data, OSD is displayed in a manner of overlaying a broadcast video or an external input video.

The frame rate converter (FRC) 380 may convert a frame rate of an inputted video. For example, the frame rate converter 380 can convert the frame rate of an inputted 60 Hz video into a frame rate of 120 Hz or 240 Hz according to an output frequency of the display unit. As described above, there may exist various methods of converting a frame rate. For instance, in case of converting a frame rate into 120 HZ from 60 Hz, the frame rate converter 380 can perform the conversion by inserting a first frame between the first frame and a second frame or inserting a third frame predicted from the first and second frames. For another instance, in case of converting a frame rate into 240 Hz from 60 Hz, the frame rate converter 380 can perform the conversion by further inserting three same or predicted frames between the existing frames. Meanwhile, in case of not performing a separate frame conversion, the frame rate converter 380 may be bypassed.

The formatter 390 may change the output of the frame rate converter 380, which is inputted thereto, to fit an output format of the display unit.

For example, the formatter 390 can output an RGB data signal. In this case, this RGB data signal can be outputted as low voltage differential signal (LVDS) or mini-LVDS. If an inputted output of the frame rate converter 380 is a 3D video signal, the formatter 390 outputs the signal by configuring a 3D format to fit the output format of the display unit, whereby a 3D service can be supported through the display unit.

Meanwhile, an audio processor (not shown) in the controller can perform audio processing of a demultiplexed audio signal. Such an audio processor (not shown) can provide supports to process various audio formats. For instance, if an audio signal is encoded in format of MPEG-2, MPEG-4, AAC, HE-AAC, AC-3, BSAC, or the like, a corresponding decoder is further included to process the audio signal. And, the audio processor (not shown) in the controller can process base, treble, volume adjustment and the like. A data processor (not shown) in the controller can process a demultiplexed data signal. For example, when a demultiplexed data signal is encoded, the data processor can decode the encoded demultiplexed data signal. Here, the encoded data signal may be EPG information including broadcast information such as start and end times of a broadcast program broadcasted on each channel, and the like.

Meanwhile, the above-described digital TV is one example according to the present invention. And, at least one of the components may be integrated, added or omitted depending on options of an actually embodied digital TV. In particular, if necessary, at least two or more components can be integrated into a single component or a prescribed component can be divided into at least two or more components. Moreover, a function performed by each block is provided to describe one embodiment of the present invention. A detailed operation or device for the function may non-limit the scope of the appended claims and their equivalents of the present invention. Meanwhile, a digital TV may include an image signal processing device configured to process a signal of an image saved in the corresponding device or a signal of an inputted image. Examples of the image signal processing device may include a settop box (STB) failing to include the display unit 330 and the audio output unit 335 shown in FIG. 3 (*a*), the aforementioned DVD player, a Blu-ray player, a game device, a computer and the like.

FIG. 4 is a block diagram showing a mobile terminal according to one embodiment of the present invention.

In FIG. 4, illustrated is a configuration block diagram of a mobile terminal 120 as another embodiment of the digital device shown in FIG. 1.

Referring to FIG. 4, the mobile terminal 400 includes a wireless communication unit 410, an A/V (audio/video) input unit 420, a user input unit 430, a sensing unit 440, an output unit 450, a memory 460, an interface unit 470, a controller 480, a power supply unit 490, etc.

The wireless communication unit 410 typically includes one or more modules which permit wireless communication between the mobile terminal 400 and a wireless communication system or network within which the mobile terminal 400 is located. For instance, the wireless communication unit 410 can include a broadcast receiving module 411, a mobile communication module 412, a wireless Internet module 413, a short-range communication module 414, a location information module 415, etc.

The broadcast receiving module 411 receives a broadcast signal and/or broadcast associated information from an external broadcast managing server via a broadcast channel. The broadcast channel may include a satellite channel and a terrestrial channel. The broadcast managing server may mean a server generating to send a broadcast signal and/or broadcast associated information or a server receiving to send a pre-generated broadcast signal and/or broadcast associated information to a terminal. The broadcast signal may be implemented as a TV broadcast signal, a radio broadcast signal, and/or a data broadcast signal, among other signals. If desired, the broadcast signal may further include a broadcast signal combined with a TV or radio broadcast signal. The broadcast associated information may include information associated with a broadcast channel, a broadcast program, or a broadcast service provider. Furthermore, the broadcast associated information can be provided via a mobile communication network. In this case, the broadcast associated information can be received by the mobile communication module 412. The broadcast associated information can be implemented in various forms, e.g., an electronic program guide (EPG), an electronic service guide (ESG), and the like. The broadcast receiving module 411 may be configured to receive digital broadcast signals using broadcasting systems such as ATSC, DVB-T (Digital Video Broadcasting-Terrestrial), DVB-S(Satellite), MediaFLO (Media Forward Link Only), DVB-H (Handheld), ISDB-T (Integrated Services Digital Broadcast-Terrestrial), and the like.

Optionally, the broadcast receiving module 411 can be configured to be suitable for other broadcasting systems as well as the above-noted digital broadcasting systems. The broadcast signal and/or broadcast associated information received by the broadcast receiving module 411 may be saved to the memory 460.

The mobile communication module 412 transmits/receives wireless signals to/from at least one of a base station, an external terminal, and a server via a mobile network. Such wireless signals may carry audio signals, video signals, and data of various types according to transceived text/multimedia messages.

The wireless Internet module 413 includes a module for wireless Internet access and may be internally or externally coupled to the mobile terminal 400. The wireless Internet technology can include WLAN (Wireless LAN) (Wi-Fi), Wibro (Wireless broadband), Wimax (World Interoperability for Microwave Access), HSDPA (High Speed Downlink Packet Access), and the like.

The short-range communication module 414 is a module for short-range communications. Suitable technologies for implementing this module include Bluetooth, radio frequency identification (RFID), infrared data association (IrDA), ultra-wideband (UWB), ZigBee, RS-232, RS-385 and the like.

The location information module 415 is a module for obtaining location information of the mobile terminal 100. And, this module may be implemented with a global positioning system (GPS) module for example.

The audio/video (A/V) input unit 420 is configured to provide audio or video signal input. The A/V input unit 420 may include a camera 421, a microphone 422 and the like. The camera 421 receives and processes image frames of still pictures or video, which are obtained by an image sensor in a video call mode or a photographing mode. Furthermore, the processed image frames can be displayed on the display 451.

The image frames processed by the camera 421 can be stored in the memory 460 or transmitted externally via the wireless communication unit 410.

Optionally, at least two cameras 421 can be provided according to the environment of usage.

The microphone 422 receives an external audio signal in call mode, recording mode, voice recognition mode, or the like. This audio signal is processed and converted into electrical audio data. The processed audio data is transformed into a format transmittable to a mobile communication base station via the mobile communication module 412 in call mode. The microphone 422 typically includes assorted noise cancelling algorithms to cancel noise generated in the course of receiving the external audio signal.

The user input unit 430 generates input data for a user to control an operation of the terminal. The user input unit 430 may include a keypad, a dome switch, a touchpad (e.g., static pressure/capacitance), a jog wheel, a jog switch, and/or the like.

The sensing unit 440 generates sensing signals for controlling operations of the mobile terminal 400 using status measurements of various aspects of the mobile terminal. For instance, the sensing unit 440 may detect an open/closed status of the mobile terminal 400, a location of the mobile terminal 400, an orientation of the mobile terminal 400, a presence or absence of user contact with the mobile terminal 400, an acceleration/deceleration of the mobile terminal 400, and the like. For example, if the mobile terminal 400 is moved or inclined, it is able to sense a location or inclination of the mobile device. Moreover, the sensing unit 440 may sense a presence or absence of power provided by the power supply unit 490, a presence or absence of a coupling or other connection between the interface unit 470 and an external device, and the like. Meanwhile, the sensing unit 440 may include a proximity sensor 441 such as NFC (near field communication) and the like.

The output unit 450 generates output relevant to the senses of vision, hearing and touch, and may include the display 451, an audio output module 452, an alarm unit 453, a haptic module 454, and the like.

The display 451 is typically implemented to visually display (output) information processed by the mobile terminal 400. For instance, if the mobile terminal is operating in phone call mode, the display will generally provide a user interface (UI) or graphical user interface (GUI) related to a phone call. For another instance, if the mobile terminal 400 is in video call mode or photographing mode, the display 451 may display photographed or/and received images or UI/GUI.

The display 451 may include at least one of a liquid crystal display (LCD), a thin film transistor-liquid crystal display (TFT-LCD), an organic light-emitting diode display (OLED), a flexible display and a three-dimensional display.

Some of the displays can be implemented in a transparent or optical transmittive type, which can be called a transparent display. A representative example of the transparent display is the TOLED (transparent OLED). A rear configuration of the display 451 can be implemented as the optical transmittive type as well. In this configuration, a user may be able to see an object located in rear of a terminal body through a region occupied by the display 451 of the terminal body.

Two or more displays 451 can be provided to the mobile terminal 400 in accordance with an implementation type of the mobile terminal 400. For instance, a plurality of displays can be disposed on the mobile terminal 400 in a manner of being spaced apart from a single face or being integrally formed on a single face. Alternatively, a plurality of displays may be disposed on different faces of the mobile terminal 400, respectively.

If the display 451 and a sensor (hereinafter called 'touch sensor') for detecting a touch action configure a mutual layer structure, the display 451 is usable as an input device as well as an output device. In this case, the touch sensor can be configured with a touch film, a touch sheet, a touchpad, or the like.

The touch sensor can be configured to convert a pressure applied to a specific portion of the display 451 or a variation of capacitance generated from a specific portion of the display 451 into an electrical input signal.

Moreover, the touch sensor is configurable to detect pressure of a touch as well as a touched position or size.

If a touch input is applied to the touch sensor, signal(s) corresponding to the touch input is transferred to a touch controller. The touch controller processes the signal(s) and then transfers the processed signal(s) to the controller 480. Therefore, the controller 480 is able to know whether a prescribed portion of the display 451 is touched.

A proximity sensor 441 can be disposed on an inner region of the mobile device enclosed by the touchscreen or near the touchscreen. The proximity sensor is a sensor that detects a presence or non-presence of an object approaching a prescribed detecting surface or an object existing around the proximity sensor using an electromagnetic field strength or infrared ray without mechanical contact. Hence, the proximity sensor is more durable than a contact type sensor and also has utility higher than that of the contact type sensor.

The proximity sensor may include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor, etc. If the touch screen includes the electrostatic capacity proximity sensor, it is configured to detect the proximity of a pointer using a variation of an electric field according to the proximity of the pointer. In this configuration, the touchscreen (or touch sensor) can be sorted into a proximity sensor.

For clarity and convenience of explanation, an action for enabling the pointer approaching the touch screen to be recognized as placed on the touch screen may be named 'proximity touch' and an action of enabling the pointer to actually come into contact with the touch screen may be named 'contact touch'. And, a position, at which the proximity touch is made to the touch screen using the pointer, may mean a position of the pointer vertically corresponding to the touch screen when the pointer makes the proximity touch.

The proximity sensor detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touch screen.

The audio output module 452 functions in various modes including a call-receiving mode, a call-placing mode, a recording mode, a voice recognition mode, and a broadcast reception mode to output audio data which is received from the wireless communication unit 410 or stored in the memory 460. During operation, the audio output module 452 may output an audio signal related to a function (e.g., call received, message received) executed in the mobile terminal 400. The audio output module 452 may include a receiver, a speaker, a buzzer and the like.

The alarm unit 453 outputs a signal for announcing the occurrence of an event of the mobile terminal 400. Typical events occurring in the mobile device may include a call signal received, a message received, a touch input received, and the like. The alarm unit 453 may output a signal for announcing the event occurrence by way of vibration as well as video or audio signal.

The video or audio signal can be outputted via the display 451 or the audio output module 452. Hence, the display 451 or the audio output module 452 can be sorted into a part of the alarm unit 453.

The haptic module 454 generates various tactile effects that can be sensed by a user. Vibration is a representative one of the tactile effects generated by the haptic module 454. The strength and pattern of the vibration generated by the haptic module 454 are controllable. For instance, different vibrations can be output in a manner of being synthesized together or can be output in sequence. The haptic module 454 is able to generate various tactile effects as well as the vibration. For instance, the haptic module 454 may generate an effect attributed to the arrangement of pins vertically moving against a contact skin surface, an effect attributed to the injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device. The haptic module 454 can be implemented to enable a user to sense the tactile effect through a muscle sense of a finger or an arm as well as to transfer the tactile effect through direct contact. Optionally, two or more haptic modules 454 can be provided to the mobile terminal 400 in accordance with a configuration type of the mobile terminal 400.

The memory 460 may store a program for an operation of the controller 480, or may temporarily store inputted/outputted data (e.g., phonebook, message, still image, video, etc.). And, the memory 460 may store data of vibrations and sounds of various patterns outputted in response to a touch input to the touchscreen.

The memory 460 may be implemented using any type or combination of suitable volatile and non-volatile memory or storage devices, including hard disk, RAM, SRAM, EEPROM, EPROM, PROM, ROM, magnetic memory, flash memory, magnetic or optical disk, multimedia card micro type memory, card-type memory (e.g., SD memory or XD memory), or other similar memory or data storage device. Furthermore, the mobile terminal 400 is able to operate in association with the web storage for performing a storage function of the memory 460 on the Internet.

The interface unit 470 may play a role as a passage to every external device connected to the mobile terminal 400 with external devices. The interface unit 470 receives data from the external devices, delivers a supplied power to the respective elements of the mobile terminal 400, or enables data within the mobile terminal 400 to be transferred to the external devices. For instance, the interface unit 470 may include a wired/wireless headset port, an external charger port, a wired/wireless data port, a memory card port, a port for coupling to a device having an identity module, audio input/output ports, video input/output ports, an earphone port, and the like.

The identity module is a chip for storing various kinds of information for authenticating a use authority of the mobile terminal 400 and may include User Identify Module (UIM), Subscriber Identity Module (SIM), Universal Subscriber Identity Module (USIM), and the like. A device having the identity module (hereinafter called 'identity device') can be manufactured in form of a smart card. Therefore, the identity device is connectible to the mobile terminal 400 through a port.

When the mobile terminal 400 is connected to an external cradle, the interface unit 470 becomes a passage for supplying the mobile terminal 400 with a power from the cradle or a passage for delivering various command signals input from the cradle by a user to the mobile terminal 400. Each of the various command signals inputted from the cradle or the power can operate as a signal for recognizing that the mobile terminal 400 is correctly installed in the cradle.

The controller 480 typically controls the overall operations of the mobile terminal 400. For example, the controller 480 performs the control and processing associated with voice calls, data communications, video calls, and the like. The controller 480 may include a multimedia module 481 that provides multimedia playback. The multimedia module 481 may be configured as a part of the controller 480, or implemented as a separate component.

Moreover, the controller 480 is able to perform a pattern recognition processing for recognizing a writing input and a picture drawing input performed on the touchscreen as a text and an image, respectively.

The power supply unit 490 is supplied with an external or internal power and then supplies a power required for an operation of each component, under the control of the controller 480.

Various embodiments described herein may be implemented in a recording medium readable by a computer or a device similar to the computer using software, hardware, or some combination thereof for example.

For hardware implementation, the embodiments described herein may be implemented within at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, and a selective combination thereof. Such embodiments may also be implemented by the controller 480.

For software implementation, the embodiments described herein may be implemented with separate software modules, such as procedures and functions, each of which performs one or more of the functions and operations described herein. The software codes can be implemented with a software application written in any suitable programming language and may be stored in memory such as the memory 460, and executed by a controller or processor, such as the controller 480.

Meanwhile, beyond the dimension of user's hand-held use, a wearable device wearable on a body may operate or function as a digital device or an external device in the present specification. Such wearable devices may include a smart watch, smart glasses, an HMD and the like.

As shown in FIG. 1, a wearable device may exchange data with or interwork with another device mutually. The short-communication module 414 may detect (or recognize) a communication enabled wearable device around. If the detected wearable device is a device authenticated to communicate with the mobile terminal 400, the controller 480 may send at least one portion of data processed in the mobile terminal 400 to the wearable device. Hence, a user can use the data processed in the mobile terminal 400 through the wearable device. For instance, if an incoming call is received by the mobile terminal 400, a phone call is performed through the wearable device. If a message is received by the mobile terminal 400, the received message can be checked through the wearable device.

FIG. 5 is a diagram showing a digital device or an external device according to another embodiment of the present invention.

Referring to FIG. 5, a watch-type mobile terminal, i.e., a smartwatch 500 includes a main body 501 with a display unit 551 and a band 502 connected to the main body 501 to be wearable on a wrist. Generally, the smartwatch 500 may include the features or similar features of the mobile terminal 400 shown in FIG. 4.

The main body 501 may include a case having a certain appearance. As illustrated, the case may include a first case 501a and a second case 501b cooperatively defining an inner space for accommodating various electronic components. Other configurations are possible. For instance, a single case may alternatively be implemented, with such a case being configured to define the inner space, thereby implementing a mobile terminal 500 with a uni-body.

The smartwatch 500 is configured to enable wireless communication, and an antenna for the wireless communication can be installed in the main body 501. The antenna may extend its function using the case. For example, a case including a conductive material may be electrically connected to the antenna to extend a ground area or a radiation area.

The display unit 551 is disposed on the front side of the main body 501 so as to output information. The display unit 551 may include a touch sensor so as to implement a touchscreen. As illustrated, a window 551a of the display unit 551 is mounted on the first case 501a to form a front surface of the terminal body together with the first case 501a.

An audio output module 552, a camera 521, a microphone 522, a user input unit 523 and the like can be provided to the main body 501. When the display unit 551 is implemented as a touchscreen, it may function as the user input unit 523, whereby a separate key may not be provided to the main body 501.

The band 502 is commonly worn on the user's wrist and may be made of a flexible material for facilitating wearing of the device. As one example, the band 502 may be made of leather, rubber, silicon, synthetic resin, and/or the like. The band 502 may also be configured to be detachable from the main body 501. Accordingly, the band 502 may be replaceable with various types of bands according to a user's preference.

Meanwhile, the band 502 may be used in extending the performance of the antenna. For example, a ground extending unit (not shown) electrically connected to the antenna to extend a ground area may be embedded in the band 502.

The band 502 may be provided with a fastener 502a. The fastener 502a may be implemented into a buckle type, a snap-fit hook structure, a Velcro (trade mark) type, or the like, and include a flexible section or material.

The drawing illustrates an example that the fastener 502a of a buckle type is implemented.

Figure 6:
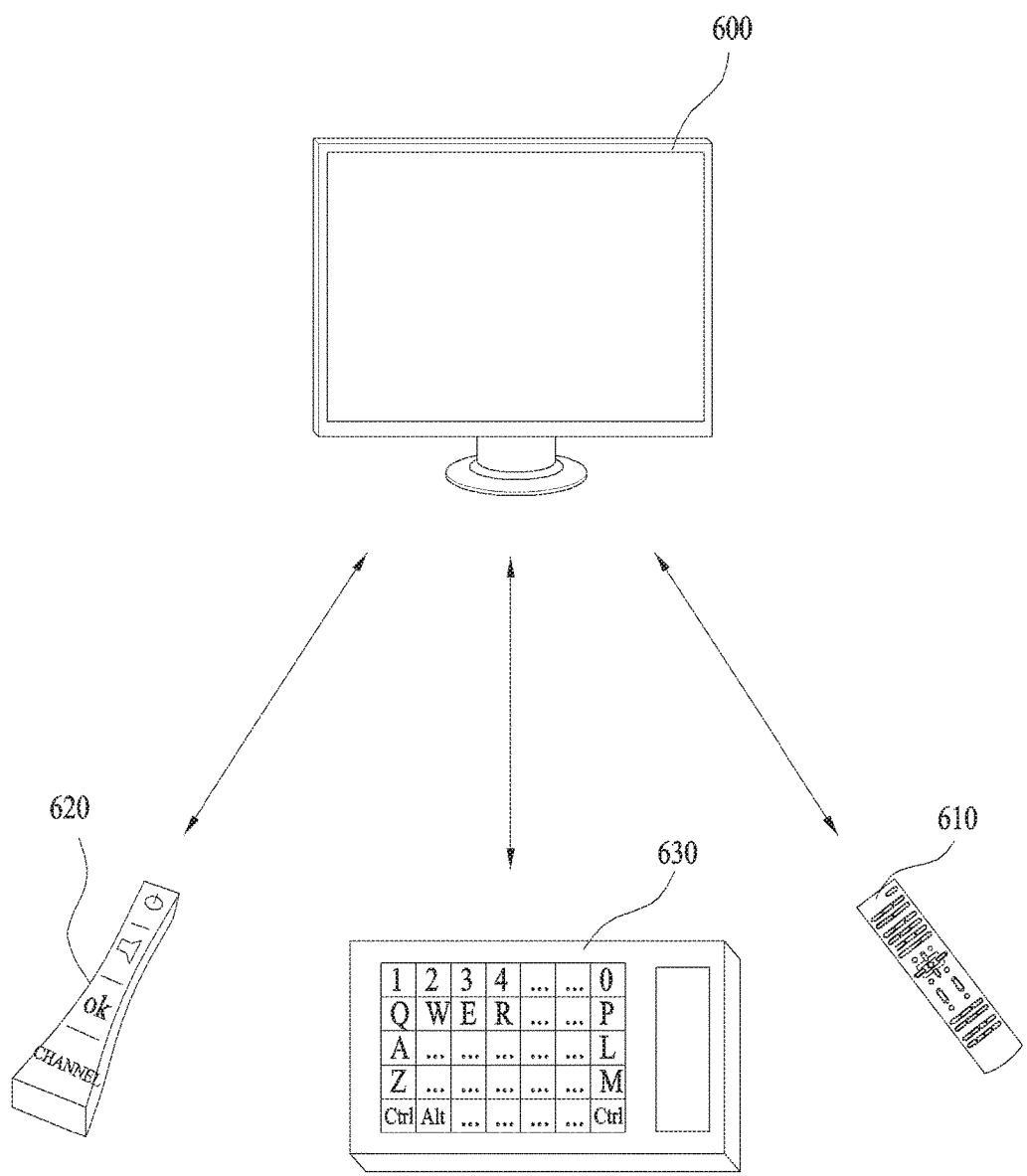
FIG. 6 is a diagram illustrating a control means for controlling a digital device according to one embodiment of the present invention.

FIG. 6 is a diagram showing a control means for controlling a digital device according to one embodiment of the present invention.

In order to control a digital device 600, a front panel (not shown in the drawing) or a control means (e.g., an input means) provided to the digital device 600 is used.

Meanwhile, as a user interface device (UID) capable of a wire/wireless communication, the control means includes a remote controller 610, a key board 630, a pointing device 620, a touchpad, or the like, mainly embodied for the purpose of controlling the display device 600. And, a control means dedicated to an external input by being connected to the display device 600 may be included as well. Besides, the control means may further include a mobile device (e.g., a smartphone, a tablet PC, etc.) capable of controlling the display device 600 through a mode switching or the like despite not having the purpose of controlling the display device 600. For clarity, a pointing device is taken as one example for the description in the present specification, by which the present invention is non-limited.

The input means can communicate with the display device by employing at least one of communication protocols as necessary. In this case, the communication protocols may include Bluetooth, RFID, IrDA (infrared Data Association), UWB, ZigBee, DLNA, RS and the like.

The remote controller 610 is a general input means provided with various key buttons required for controlling the display device 600.

The pointing device 620 provided with a gyro sensor and the like delivers a prescribed control command to the display device 600 by embodying a corresponding pointer on a screen of the display device 600 based on a user's motion, a pressure, a rotation and the like. The pointing device 620 may be called one of various names such as a magic remote controller, a magic controller and the like.

As the display device 600 is an intelligence integrated display device capable of providing various services such as a web browser, an application, an SNS (social network service) and the like as well as broadcasts, it is difficult to control the display device 600 using a conventional remote controller 610. Hence, the keyboard 630 is embodied into a configuration similar to a PC keyboard to facilitate inputs of text and the like by complementing the control difficulty.

Meanwhile, the control means such as the remote controller 610, the pointing device 620, the keyboard 630, or the like is provided with a touchpad as necessary and is usable for the various control purposes of facilitating text inputs, pointer shifts, zoom-in/out of photo or video, and the like.

Hereinafter, data communication of one digital device and one or more other digital devices connected with the one digital device through a network in accordance with the present invention will be described in more detail with reference to the accompanying drawings.

Although each of the drawings and corresponding technologies disclosed in this specification may be one embodiment, one embodiment may be configured by combination of at least one or more drawings and technologies. One drawing and corresponding technologies may configure a plurality of embodiments as well as one embodiment. Also, although description is made for a specific drawing in this specification, this is intended for convenience of description, and the description may be applied to same or similar other drawings and disclosure. Meanwhile, the disclosure in this specification may be applied in various forms such as device unit and application unit.

Hereinafter, various embodiments will be described to provide an intuitive user interface for data communication between one control device of a plurality of digital devices and one or more operation devices, whereby states of the operation devices may be identified sequentially or simultaneously and operation control of the operation devices may be performed more easily and conveniently.

The control device is a main device which is a reference of data communication with operation devices of a plurality of digital devices. It is not required that the control device should always be a fixed device. Therefore, the control device may be modified for a specific operation. For convenience of description, a plurality of digital devices will be divided into a control device and operation devices in this specification. However, these titles are intended to identify the digital devices, and the present invention is not limited to this case. Meanwhile, for understanding of the present invention, the control device will be described, but not limited to, as a mobile terminal, and the operation device(s) will be described, but not limited to, as IoT device(s).

The number of the control device is not limited to one, and a plurality of control devices may be provided. When a plurality of control devices are provided, the respective control devices do not need to have the same type, attribute, etc. For example, the first control device may be a mobile terminal, and the second control device may be a digital TV.

For example, a data processing method in the digital device, that is, the control device may include receiving a first control signal, determining a state of a screen of the digital device in response to the first control signal, connecting the digital device with at least one or more external devices in accordance with the determined state, and displaying a user interface related to the at least one or more external devices on the screen.

Alternatively, a data processing method of a control device according to the present invention may include receiving a first control signal while a screen of the control device is turned off, connecting the control device with at least one or more external devices in accordance with the received control signal, receiving data from the at least one or more external devices, and displaying a user interface related to the at least one or more external devices on the screen with reference the data received from the at least one or more external devices.

Figure 7:
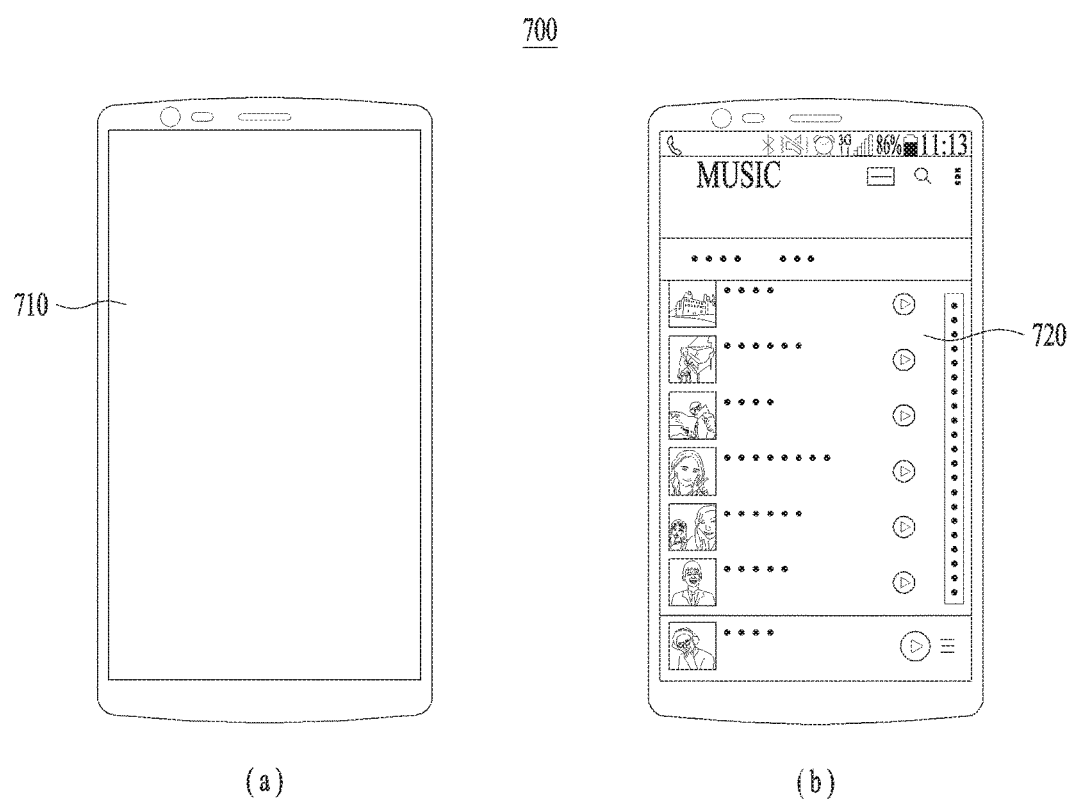
FIG. 7 is a diagram illustrating a state of a control device for controlling operation device(s) according to one embodiment of the present invention.

FIG. 7 is a diagram illustrating a state of a control device for controlling operation device(s) according to one embodiment of the present invention.

The control device 700 may determine whether to control the operation device in accordance with its state. Also, the control device 700 may have different control types and different control powers for the operation device in accordance with its state.

The state of the control device 700 may be defined differently depending on its device type, device attribute, etc.

Referring to FIG. 7, the state will be described as on/off of a screen of the control device 700, a touch screen (hereinafter, 'screen'), etc. Meanwhile, off of the screen of the control device 700 does not mean power-off of the control device.

The control device may output predetermined data and execute and output an application, regardless of the screen-off. For example, the mobile terminal (control device) may execute a music application at the screen-off state, and may output audio data corresponding to the output according to the music application, which is being executed, through a speaker, an earphone, a headphone, a Bluetooth device, etc.

As an embodiment, in this specification, the mobile terminal 700 may control the operation device(s) during the screen-off. However, as described above, the present invention is not limited to the screen-off of the mobile terminal 700. However, the screen-on state of the mobile terminal 700 indicates that various inputs may relatively be received as compared with the screen-off state. Therefore, the present invention may be applied through identification for the various inputs which are received.

FIG. 7a illustrates an-off state 710 of the screen of the mobile terminal, and FIG. 7b illustrates an on-state 720 of the screen of the mobile terminal.

Figure 8:
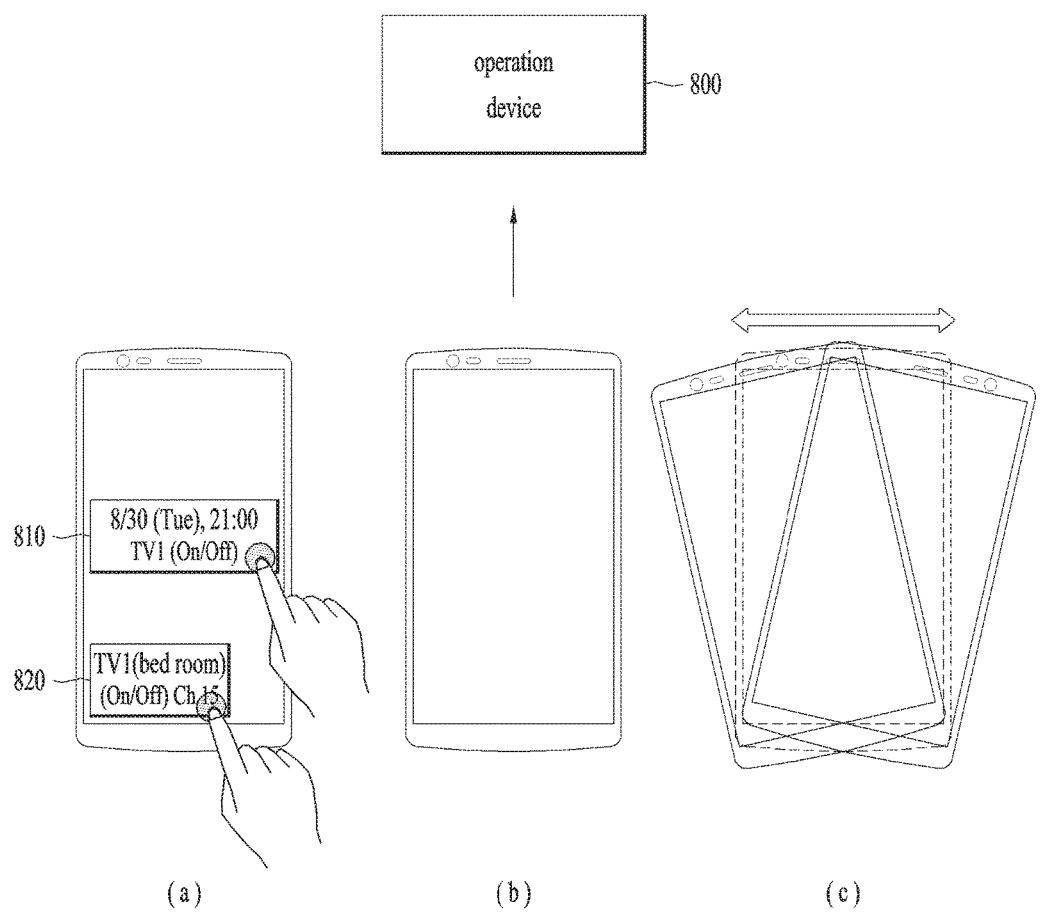
FIG. 8 is a diagram illustrating an input method of a control device for controlling an operation device according to one embodiment of the present invention.

FIG. 8 is a diagram illustrating an input method of a control device for controlling an operation device according to one embodiment of the present invention.

The control device, that is, the mobile terminal 700 may receive a signal for controlling the operation device 800 in various forms.

Referring to FIG. 8a, the mobile terminal 700 may receive a control signal of the operation device 800 while the screen of the mobile terminal is turned off. In this case, the input may be performed through a touch, voice, gesture, etc. For example, the input may be performed through any area of the screen. For convenience, a touch input will be described as an example. However, if the control device is the mobile terminal 700, for identification from an input related to a function of the mobile terminal, a function, signal, etc. related to the present invention may be activated only in case of an input such as a touch for a specific area (for example, edge of the screen) of the screen which is turned off.

In this way, if a touch input is received while the screen is turned off, the mobile terminal 700 may determine whether the corresponding touch input is a touch input for performing the function of the mobile terminal or a touch input for controlling the operation device 800 related to the present invention.

As a result of the determination, if the corresponding touch input is a touch input for performing the function of the mobile terminal, the screen is turned on, whereby related data may be provided. However, as a result of the determination, if the corresponding touch input is a touch input related to the present invention, the mobile terminal 700 maintains the screen-off and may provide a user interface for a control signal of the operation device 800 on a screen center 810 or an edge 820 of the screen as shown in FIG. 8a. In this case, the screen of the control device, that is, the mobile terminal 700 continuously maintains the off-state even though the user interfaces 810 and 820 are output. However, even though the screen is changed to the on-state in accordance with the system or device, the user interfaces 810 and 820 may be provided as shown in FIG. 8a.

The mobile terminal 700 may provide UIs 810 and 820 of the same type as a message according to the touch input within the screen in accordance with the touch input. At this time, the UIs 810 and 820 may be provided on a point or area corresponding to a touch point or area within the screen, for example.

Also, the UIs 810 and 820 include information on at least one operation device. The information on the operation device may be different from or the same as each other depending on the operation device. For example, in FIG. 8a, the UIs 810 and 820 include at least one of time information of the operation device, operation device identification information, and function information of the operation device. Although not disclosed, the UIs 810 and 820 may include various kinds of information on the operation device.

Meanwhile, the UIs 810 and 820 shown in FIG. 8a may be initial UIs for controlling the operation device through the mobile terminal 700. In other words, the UIs 810 and 820 have a layered structure in accordance with their selection and may further provide more detailed information in accordance with a depth.

In addition, the UIs 810 and 820 shown in FIG. 8a may be provided in various types in addition to the shown type, and may have different types depending on the operation or control device. Also, instead of the UIs 810 and 820, an audio type may be provided, and information may be provided to another control device.

Also, the UIs 810 and 820 shown in FIG. 8*a* may be provided simultaneously or sequentially with respect to a plurality of operation devices not one operation device.

The mobile terminal 700 allows a heading direction of the mobile terminal to be headed for the operation device as shown in FIG. 8*b* or takes a gesture as shown in FIG. 8*c*, whereby a control signal may be generated. At this time, the heading direction of the mobile terminal 700 may be determined based on data sensed by at least one of various sensors such as a gyro sensor for sensing a direction within the mobile terminal, a sensor for identifying an object, and a heat sensor for sensing heat. Alternatively, if movement of the mobile terminal is sensed, the heading direction of the mobile terminal may be identified through broadcasting/advertisement of an IR signal through an IR sensor and a response of the operation device that receives the IR signal.

If the heading direction of the mobile terminal is headed for the operation device 800 through FIG. 8*b*, the mobile terminal may provide information such as the UI described in FIG. 8*a*.

The gesture (for example, left and right gesture) of FIG. 8*c* may generate a control signal only if the heading direction of the mobile terminal 700 is headed for the operation device 800 as shown in FIG. 8*b*.

Meanwhile, the mobile terminal 700 may provide the UI even in FIGS. 8*b* and 8*c* before the control signal is generated. At this time, although not shown, the UI may include information on the corresponding operation device 800.

Connection between the control device and the operation device is intended for data communication, and may be performed simultaneously with or prior to reception of the first control signal when the control device is turned on.

The first control signal may be received through a control means for controlling the operation device, or may be generated and received by a touch input of a user. Alternatively, the first control signal may be generated automatically by the control device in accordance with a predetermined condition such as voice input or if there is movement of the control or operation device, or may automatically be received in the control device. In addition, the control device may be operated randomly in accordance with the first control signal or a predetermined condition even without signal reception.

Meanwhile, the mobile terminal 700 may control the operation device 800 when the screen is turned on and off. At this time, entrance of the mobile terminal for controlling the operation device 800 may be different for each of the screen-on and the screen-off. For example, when the screen of the mobile terminal 700 is turned on, UI and signal for controlling the operation device 800 may be generated only if at least one of edges of the screen is touched. However, a touch area for the case that the screen is turned off may be different from that corresponding to the case that the screen is turned on.

However, for convenience, the control of the operation device will be described without separate reference of the screen-on/off. Meanwhile, in this specification, providing the UI may simply mean that data are displayed on the screen, but may mean that audio data may be provided together with the UI.

Figure 9:
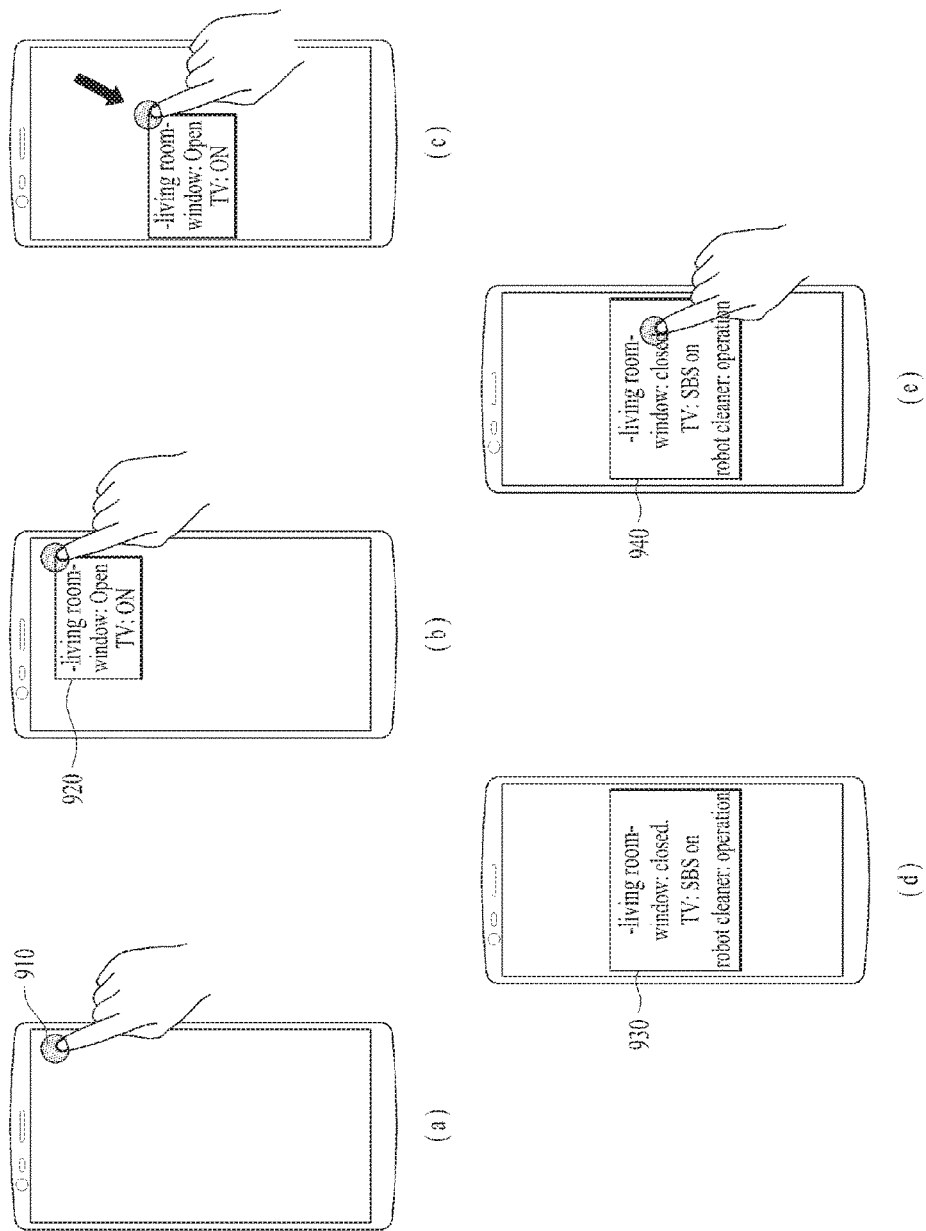
FIG. 9 is a diagram illustrating a UI provided by a control device to control an operation device according to one embodiment of the present invention.

FIG. 9 is a diagram illustrating a UI provided by a control device to control an operation device according to one embodiment of the present invention.

FIG. 9 illustrates one of operation device control scenarios through a mobile terminal.

Referring to FIG. 9*a*, the mobile terminal provides a first UI 920 as shown in FIG. 9*b* if a first area 910 among edge areas of a screen (or touch available area within the screen) is touched.

The first UI 920 provides state information on operation devices such as a window of a living room and a TV. For example, referring to FIG. 9*b*, the mobile terminal may indicate that the window which is the operation device is an open state and the TV is currently an on-state, through the first UI 920.

Referring to FIG. 9*c*, the mobile terminal may provide the first UI 920 by moving the first UI 920 to a predetermined area within the screen if a moving signal for the first UI 920 is received. For example, if a user selects the first UI 920 and then drags & drops the selected first UI 920 to another area within the screen, the mobile terminal 700 provides the first UI 920 by moving the first UI 920 to the dropped position.

Referring to FIG. 9*d*, if the first UI 920 moves to another area of the screen in accordance with FIG. 9*c*, the mobile terminal may change the first UI 920 to a second UI 930. In this case, the second UI 930 may provide detailed information of the operation device unlike the first UI 920 that indicates only the current state of the operation device. Alternatively, the second UI 930 may provide information different from that of the first UI 920. For example, the first UI 920 may provide state information of the operation device, such as a window of a living room and a TV, in FIG. 9*c*, whereas the second UI 930 may provide state information of the aforementioned operation device and another operation device, such as a lamp of a living room and a robot cleaner, in FIG. 9*d*. Meanwhile, the second UI 930 of FIG. 9*d* may be another type example, which is different from FIG. 9*b* according to reception of the touch input signal of FIG. 9*a*.

Referring to FIG. 9*e*, the operation device or the state information on the UI provided as shown in FIG. 9*b* or 9*d* may be provided in an accessible type, and the state of the operation device may be switched and controlled to another state different from the current state by accessing the operation device or the state information. In this case, if state switching control of the operation device according to the state switching control signal is completed, the user may recognize the switching control more easily through audio data together with change of the state information of the operation device on the UI in response to a response signal of the operation device.

Figure 10:
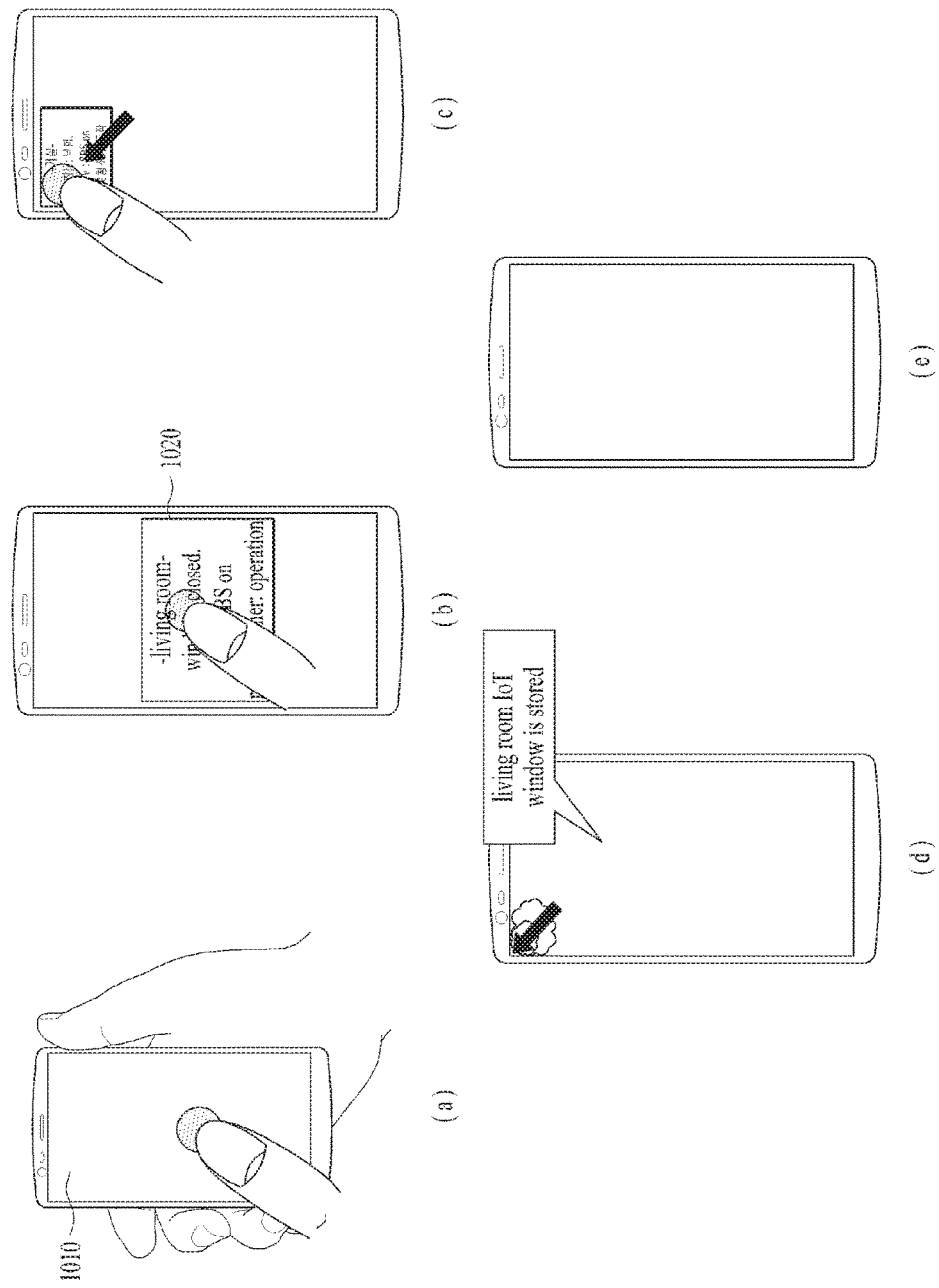
FIG. 10 is a diagram illustrating a method for controlling an operation device through a control device according to one embodiment of the present invention.

FIG. 10 is a diagram illustrating a method for controlling an operation device through a control device according to one embodiment of the present invention.

The method for controlling an operation device while a predetermined application is being used on a mobile terminal will be described with reference to FIG. 10.

Referring to FIG. 10*a*, the mobile terminal provides a predetermined application execution screen 1010 on the screen. At this time, the mobile terminal 700 provides a UI 1020 on the application execution screen 1010 as shown in FIG. 10*b* if a specific touch input (for example, long touch, force touch, etc.) for a predetermined area within the screen on which the application execution screen 1010 is being provided is received. In this case, the UI 1020 may be overlaid on the application execution screen 1010 or may be provided through a pop-up window.

If the UI 1020 provided in FIG. 10*b* is dragged & dropped to a predetermined area (for example, edge of the screen) within the screen of the mobile terminal as shown in FIG. 10*c*, the mobile terminal may temporarily or continuously display an icon, which may identify a predetermined operation device included in the UI, at the dropped position and display that an interface for the operation device has been registered and stored, through voice, pop-up window, etc.

As shown in FIG. 10e, the mobile terminal returns to the original state. For example, as described above, the mobile terminal may provide the application execution screen, which is being previously provided, or may be switched to a screen-off state or home screen.

Figure 11:
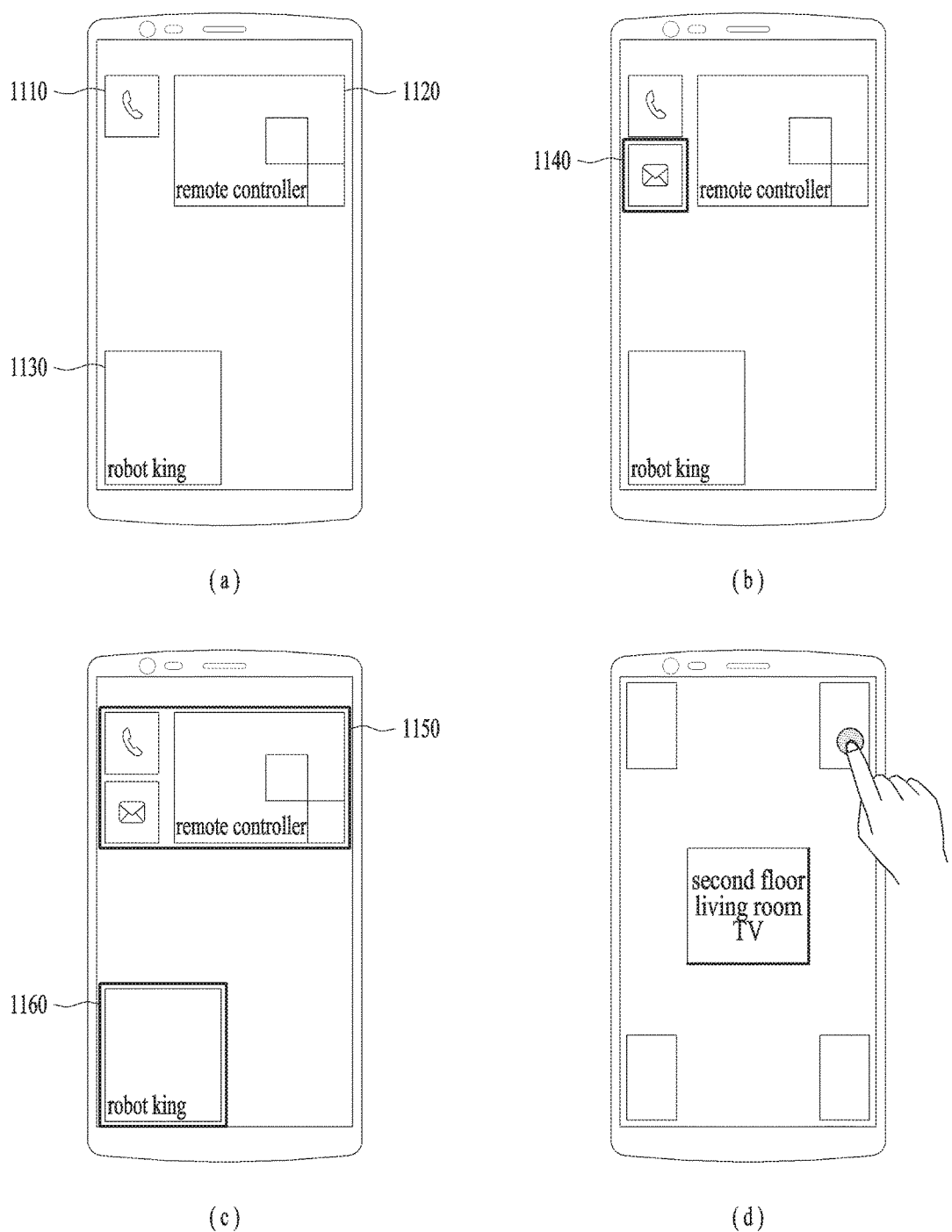
FIGS. 11 and 12 are diagrams illustrating operations such as registration and storage of an operation device on a control device according one embodiment of the present invention.
Figure 12:
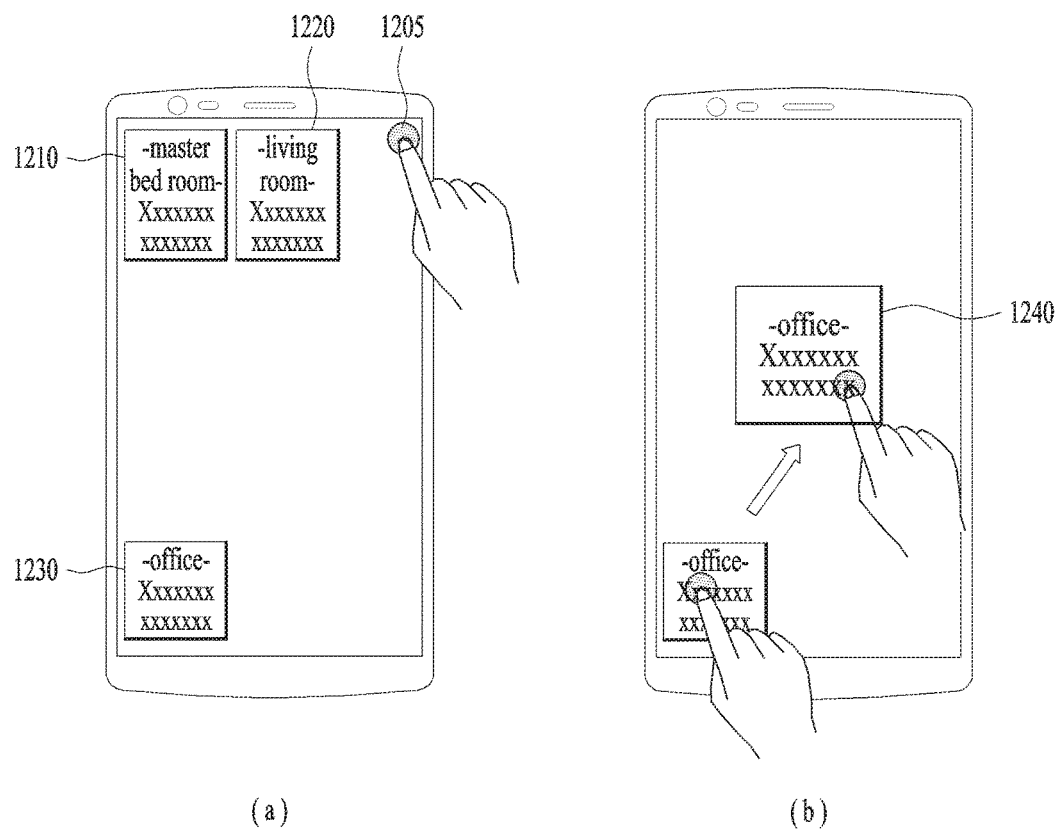

FIGS. 11 and 12 are diagrams illustrating operations such as registration and storage of an operation device on a control device according one embodiment of the present invention.

FIG. 11 relates registration/storage of the operation on the control device, and FIG. 12 relates to unregistration of the operation device registered/stored on the control device.

Referring to FIG. 11a, indicators 1110, 1120 and 1130 for the operation devices previously stored on the screen of the mobile terminal are provided. In this case, the indicator for each operation device may be arranged at one of edges within the screen of the mobile terminal. The position of the indicator may be provided automatically or manually, or may be changed randomly. Meanwhile, referring to FIG. 11a, the respective indicators may be different from one another in size, color, and information as well as their positions. The size, color and information of each indicator may be changed randomly. For example, the mobile terminal may configure the indicator for the operation device mainly used by the user at a size greater than those of the other indicators and a color to allow the user to easily identify the corresponding indicator. In other words, the mobile terminal may continue to collect data of the operation device in accordance with usage frequency, usage pattern, etc. of the user, thereby performing personalization through the indicator. Data provided to the aforementioned indicator may be configured automatically based on a function, state, etc., which are frequently used by the user, through the operation device corresponding to the corresponding indicator.

FIG. 11b illustrates that a new operation device is added to FIG. 11a. In FIG. 11b, the indicator for the corresponding operation device may be provided to a predetermined edge area within the screen of the mobile terminal. At this time, a position of the added indicator 1140 may be determined appropriately considering a type of the corresponding operation device, importance, power consumption, usage frequency or usage pattern, physical size of the operation device, etc. For example, the mobile terminal may provide a group type indicator when providing the indicator, and may provide a detailed indicator if the indicator is selected. For example, if there are three TVs of registered operation devices, TV1, TV2 and TV3 may be allocated to the edge within the screen of the mobile terminal, but a group indicator called a TV may be provided at a predetermined edge. If the group indicator is selected, predetermined information may be provided together with an indicator for TVs which belong to the group.

Referring to FIG. 11c, the mobile terminal may edit the indicators. For example, the mobile terminal may provide editing convenience of the user by providing a tool (not shown) to perform an editing function with reference to group data. For example, if a group is divided into a living room and a bed room on a home network, and operation devices belonging to the living room and operation devices belonging to the bed room coexist, it may give confusion to the user. Therefore, the operation devices may be provided to be edited. Meanwhile, in FIG. 11c, the indicator for the operation device of the activated state and the indicator for the operation device of the deactivated state may be configured differently from each other in size, color, etc., whereby the user may intuitively recognize the state of the operation device.

Referring to FIG. 11d, each edge of the screen of the mobile terminal may correspond to a physical position of a home. Although each edge may mean a group type including the operation devices as described above, each edge may interact with the physical position such as a living room, a kitchen, a bed room, and a bath room inside a floor or home. Therefore, as shown in FIG. 11d, if a predetermined edge selection signal of the screen of the mobile terminal is received, the mobile terminal may provide information (for example, second floor, living room, etc.) on a physical position corresponding to the selected edge and information (for example, TV, etc.) on the operation device registered in the physical position. This information may be edited randomly.

Referring to FIG. 12a, if a predetermined edge 1205 on the mobile terminal is touched, the mobile terminal may display indicators 1210, 1220 and 1230 for the registered operation device on a predetermined area of the screen. At this time, the predetermined area on which the indicators 1210, 1220 and 1230 are displayed may be an area configured during pre-registration.

In FIG. 12b, if a predetermined one 1230 of the indicators displayed in FIG. 12a is selected (touched or dragged & dropped), the mobile terminal provides the selected indicator to the predetermined area within the screen. Afterwards, if the corresponding indicator 1240 is long-clicked or dragged in a specific direction, the corresponding indicator 1240 may be deleted. If the corresponding indicator 1240 is deleted, the mobile terminal may unregister the operation device corresponding to the deleted indicator 1240 and delete registration information from a memory. This deletion and unregistration of the indicator may be performed on the initial position or the mobile terminal through another touch input.

Figure 13:
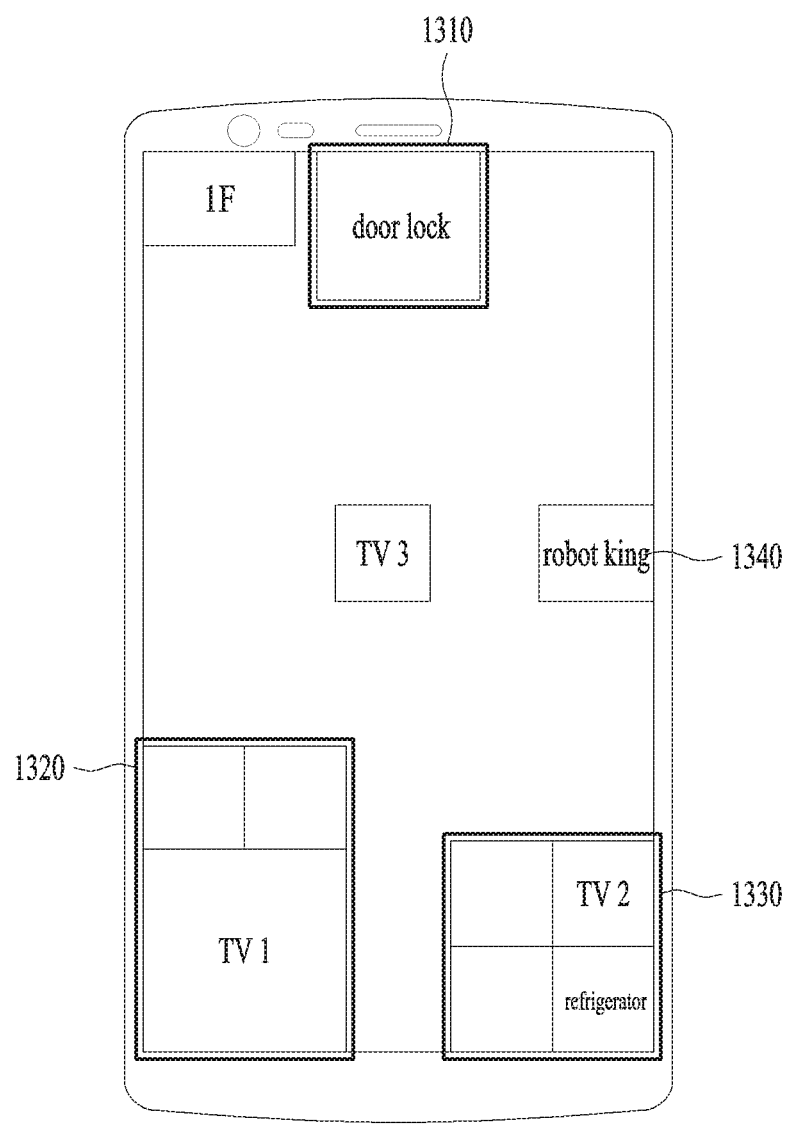
FIGS. 13 to 15 are diagrams illustrating a method for controlling an operation device through a control device according to one embodiment of the present invention.
Figure 14:
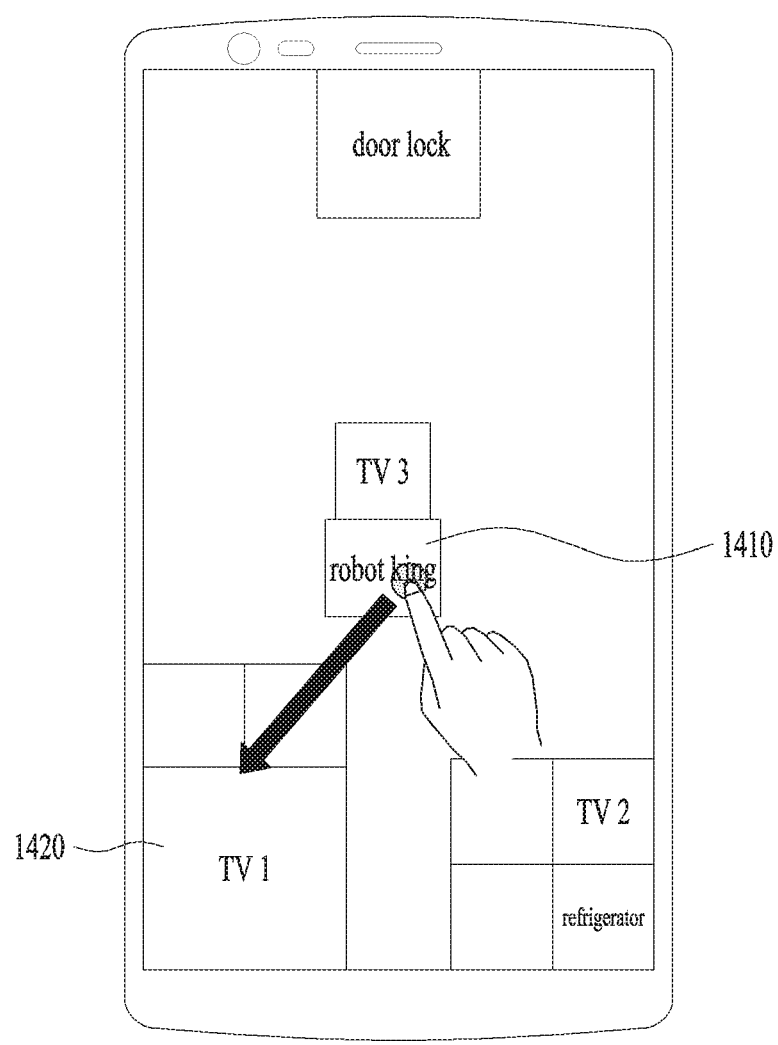
Figure 15:
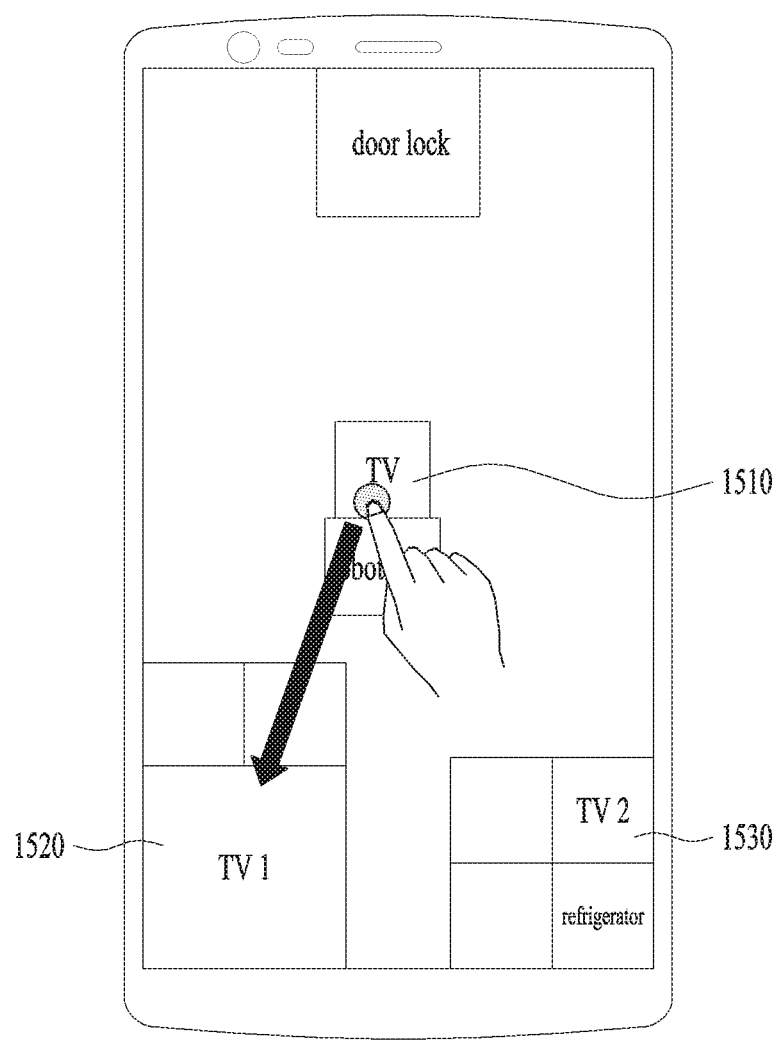

FIGS. 13 to 15 are diagrams illustrating a method for controlling an operation device through a control device according to one embodiment of the present invention.

Referring to FIG. 13, the mobile terminal provides indicators for operation devices registered through the screen. In this case, the indicators may be provided based on the current position of the mobile terminal, or may be provided for a specific position. For example, in FIG. 13, indicators for the operation devices registered in the first floor of a home may be displayed. The indicators may be determined based on a reference point (for example, porch) 1310 in such a manner that which one of the indicators 1310, 1320 and 1330 for the operation device will be arranged on each edge. Alternatively, the area for providing the indicator may be determined or changed in accordance with a current position compared with the reference point or a heading direction of the mobile terminal.

FIG. 14 may be an embodiment that the user desires to control the operation device, that is, robo king in FIG. 13. In FIG. 13, if the user desires to control the operation device, that is, robo king, an indicator 1410 for the operation device which is robo king may move to a predetermined area within the screen of the mobile terminal. In this case, information of the indicator may include detailed information, function information, etc. depending on the movement. Alternatively, if a desired operation command is given in FIG. 13, the indicator may move to another area within the screen and indicate that the operation is currently controlled.

In FIG. 14, if the user desires to perform an operation (for example, cleaning) in a real area to which TV1 belongs, through the operation device of robo king, the user drags & drops the indicator 1410 corresponding to the operation device of robo king to a virtual area 1420 to which TV1 belongs. In this case, the mobile terminal generates and transmits a control signal for the operation device of robo king by reading the dragged & dropped indicator information. The operation device of robo king may perform a corresponding operation in accordance with reception of the control signal of the mobile terminal. At this time, the operation device may provide a feedback when the corresponding operation is completed. If a feedback signal is received from the operation device, the mobile terminal may return the corresponding indicator to the original area or display the result of the operation which is performed, through a pop-up window, text, etc. Meanwhile, the mobile terminal may provide flickering to display that the operation is currently performed and allow the user to intuitively recognize that the operation is currently performed, before the feedback signal is received from the operation device in accordance with the request of the operation.

FIG. 15 illustrates a group indicator 1510 of the operation device on a predetermined area of the screen of the mobile terminal. If a selection signal of the group indicator 1510 (for example, TV) is received, the mobile terminal may automatically activate and function as a first indicator 1520 (TV1) and a second indicator 1530 (TV2) related to the group indicator 1510 within the screen in response to the signal. In this case, the mobile terminal may control a plurality of operation devices at one time through an access to the group indicator 1510.

FIGS. 16 to 20 are diagrams illustrating a method for controlling an operation device through a control device according to another embodiment of the present invention.

FIGS. 16 to 20 are similar to FIGS. 13 to 15 but are different from FIGS. 13 to 15 in that the mobile terminal provides map data of a position to which the mobile terminal belongs, to enable more intuitive control of the operation device through the mobile terminal.

Figure 16:
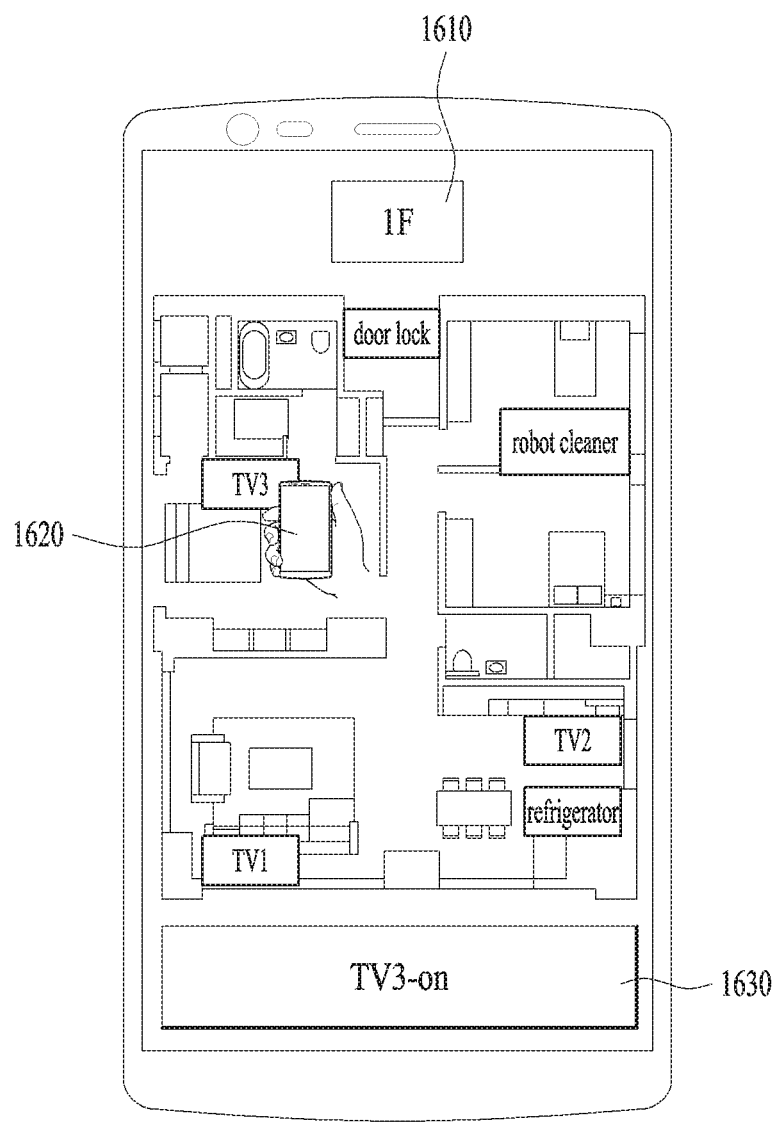
FIGS. 16 to 20 are diagrams illustrating a method for controlling an operation device through a control device according to another embodiment of the present invention.

FIG. 16 illustrates a mobile terminal that displays map data.

The mobile terminal may provide information on registered operation devices on the basis of the map data as well as map data corresponding to the position of the mobile terminal within a home. Meanwhile, the mobile terminal may also provide current position data 1620 of the mobile terminal on the map data on the screen.

In this case, identification data 1610 on the position of the map data currently provided on the screen and information 1630 on the operation device currently activated on the map or closest to the map or the operation device currently used on the map most frequently or accessed just before may be provided together with the above information.

Figure 17:
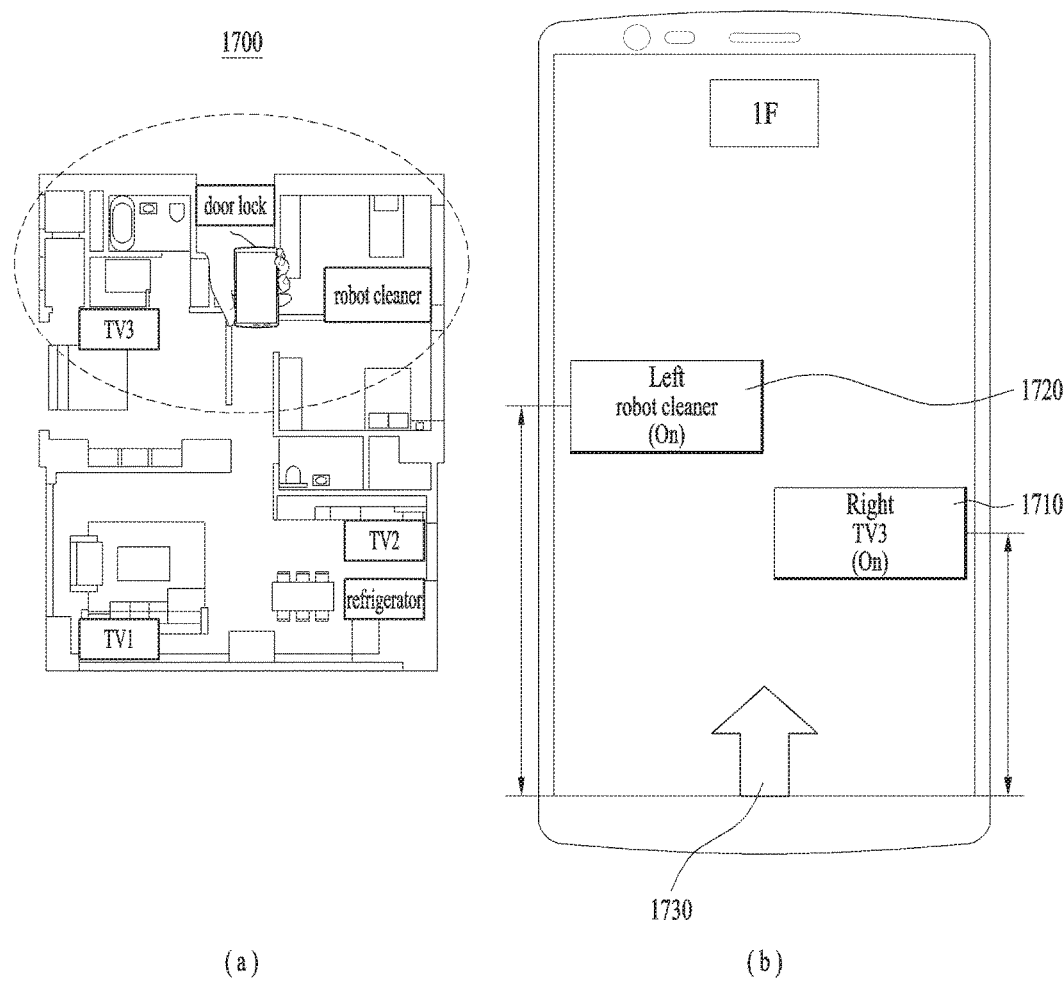

FIG. 16 illustrates that the mobile terminal is fixed to the current position or data of a first state, whereas FIG. 17 illustrates that movement of the mobile terminal is sensed or data of a second state.

As shown in FIG. 17a, supposing that the position of the mobile terminal is moving from a door lock position to a real position, the mobile terminal may provide identification data on the current position, current moving direction or heading direction identification data 1730 of the mobile terminal, and information or indicators 1710 and 1720 on the operation device arranged within a predetermined range or distance on the basis of the current position of the mobile terminal.

In this case, the mobile terminal may provide whether the operation device has been arranged at a left side or a right side based on a current moving direction or heading direction of the mobile terminal and a distance from the current position.

Referring to FIG. 18a, supposing that the mobile terminal finally moves from the periphery of a door lock of a real position to the operation device of TV1, the mobile terminal may continue to update and provide information on the operation device on the basis of the moving direction as described in FIG. 17.

For example, the mobile terminal updates the indicator for the operation device provided in FIG. 17b on the basis of its position as shown in FIG. 18b while moving to a first point 1810 of FIG. 18a and updates an indicator 1820 for a newly added operation device. Referring to FIG. 18b, an area of a screen in which indicators for TV3 and robot cleaner provided in FIG. 17b are provided is changed. Meanwhile, as the area of the screen is changed, if the indicators are arranged below a predetermined area, the corresponding indicators may be processed to be seen as being deactivated.

Figure 19:
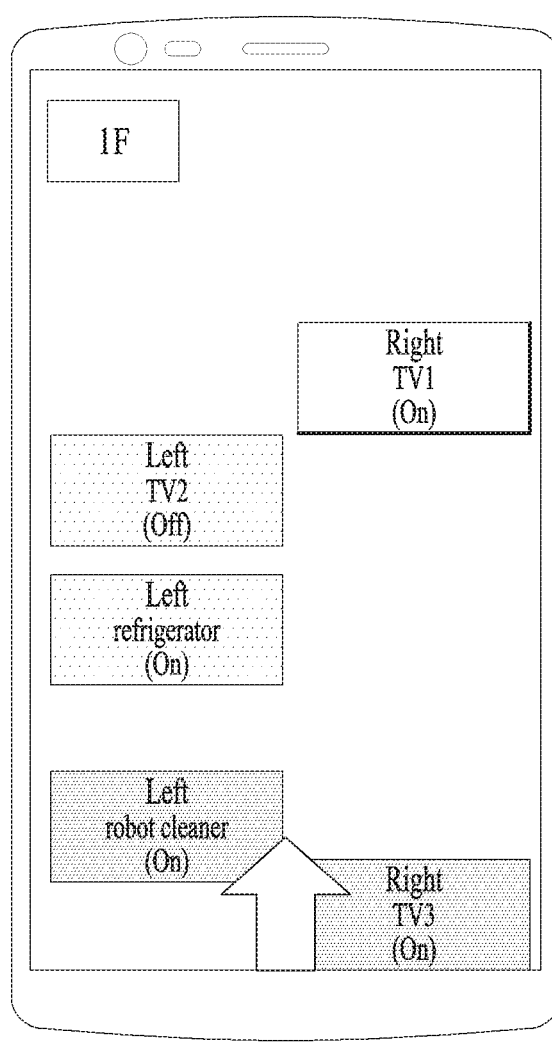

FIG. 19 illustrates an updated content for the indicator of the operation devices corresponding to the case that the mobile terminal arrives in a final destination through a first pointer.

Referring to FIG. 19, the mobile terminal processes the indicators provided below the reference line as being deactivated. The indicators for TV2 and refrigerator, which are far away from each other as the mobile terminal moves to a right side at the first point, may be processed differently from the indicator for TV1 close to the destination.

Figure 18:
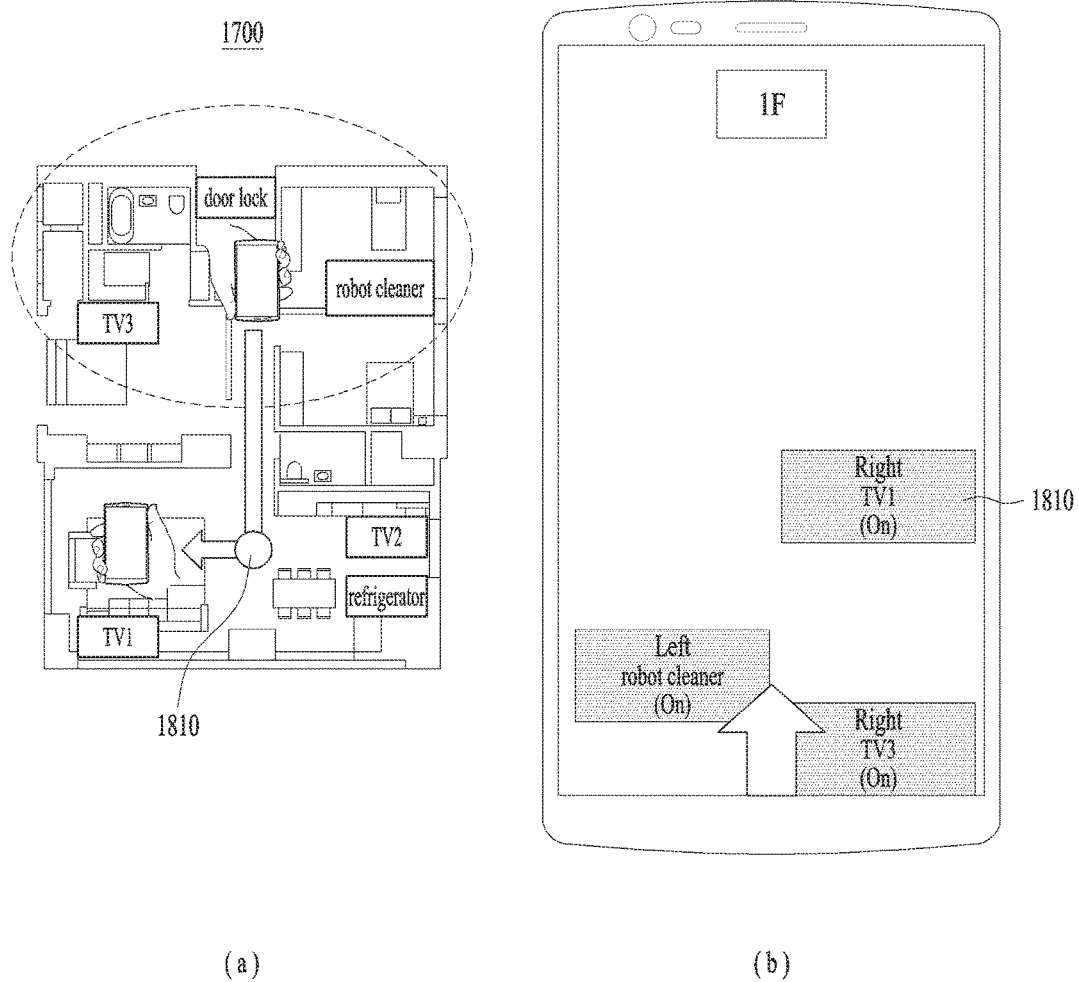
Figure 20:
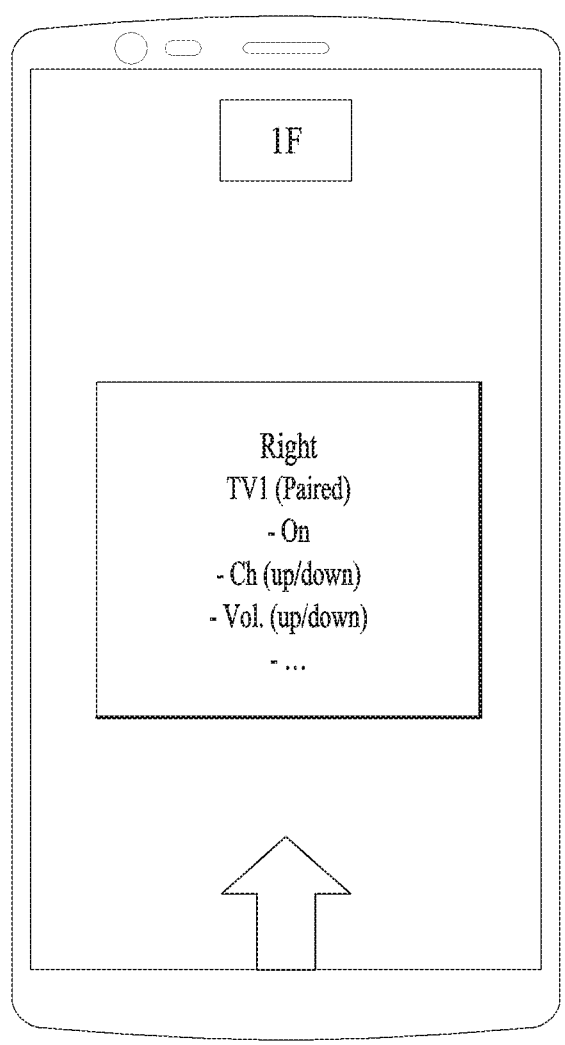

In this way, if the mobile terminal is moving through FIGS. 17 to 19 and then fixed to a predetermined real position or real area, the mobile terminal may provide the indicator for the operation device which belongs to the fixed position, to a predetermined area within the screen as shown in FIG. 20. In this case, if a plurality of indicators exist at the corresponding area, the indicator closest to the mobile terminal and the indicator which is used most frequently may be provided or configured as shown in FIG. 21a to be selected.

Figure 21:
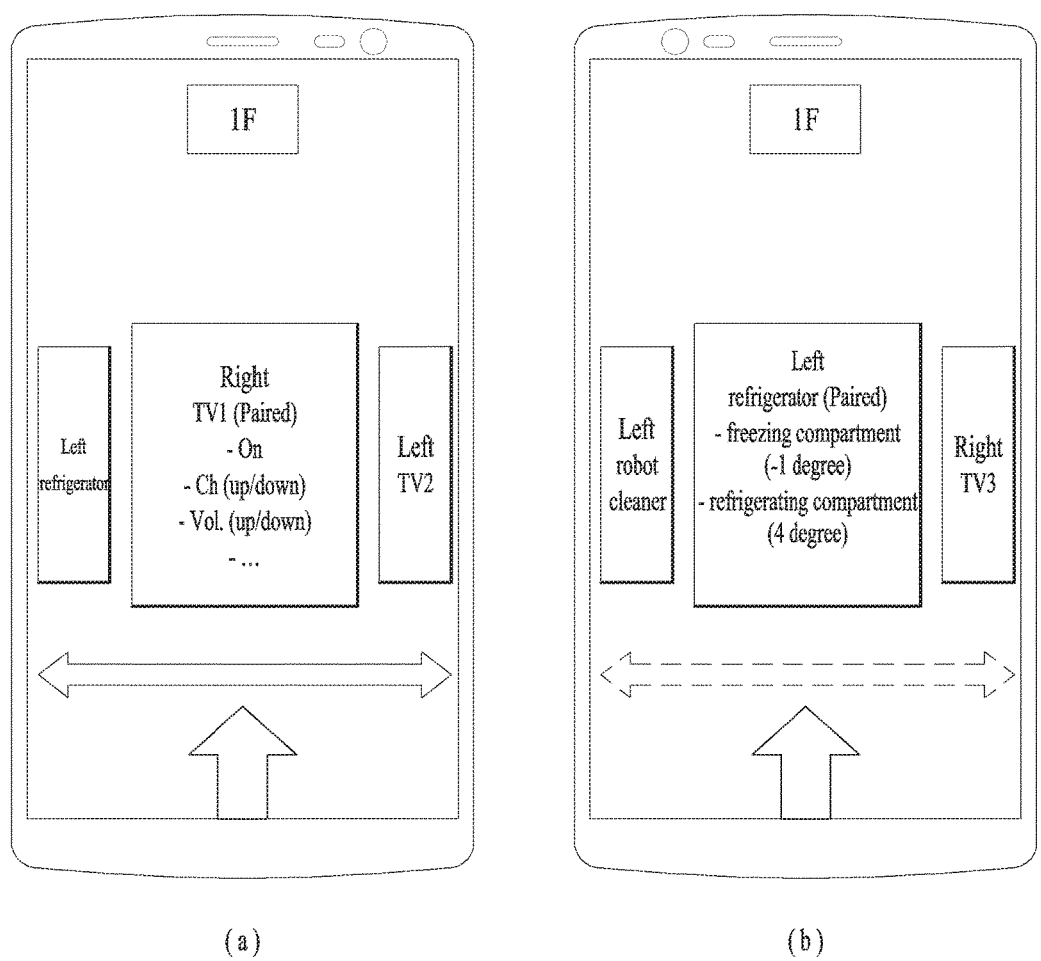
FIGS. 21 and 22 are diagrams illustrating a method for controlling a UI on a control device for controlling an operation device according to one embodiment of the present invention.
Figure 22:
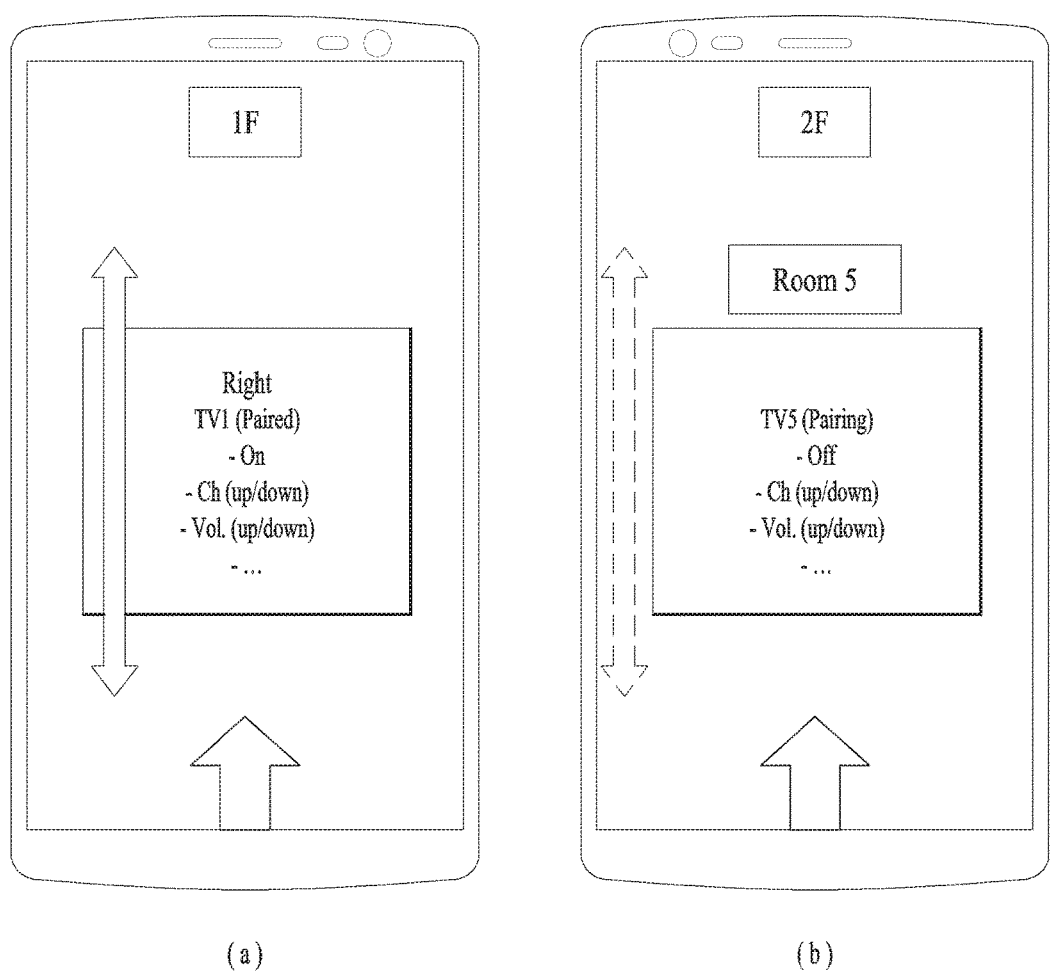

FIGS. 21 and 22 are diagrams illustrating a method for controlling a UI on a control device for controlling an operation device according to one embodiment of the present invention.

FIGS. 21 and 22 relate to a method for controlling a UI provided by the control device. The mobile terminal may receive input signals in an up and down direction and a left and right direction at the state of FIG. 21a or 22a.

Referring to FIG. 21a, if a left and right flickering signal is received while the mobile terminal is providing a list of indicators for the operation device through the screen, the mobile terminal may process the UI such that the other indicators may be provided to be enlarged at the center of the screen as shown in FIG. 21b.

Meanwhile, referring to FIG. 22a, the mobile terminal may provide UI in the same manner as that of FIG. 21a. However, if an up and down flickering signal not the left and right flickering signal of FIG. 21 is received, a list of indicators for the operation device of another floor instead of the first floor may be provided as shown in FIG. 22b.

Meanwhile, although not shown, if the up and down flickering signal selects a specific indicator, detailed information and additional information on the operation device of the corresponding indicator may be provided unlike the aforementioned description.

Therefore, according to various embodiments of the present invention, data communication may easily be performed between a plurality of digital devices, and data communication and control may be performed intuitively and easily between a main device (or control device) of a plurality of digital devices and a sub device(s) (or operation device(s)). Also, the plurality of operation devices may be controlled sequentially or simultaneously by one control device, and operation control and state identification of each operation device may be performed more easily, whereby user convenience may be improved.

The digital device and the data processing method in the digital device disclosed in this specification are not limited to the aforementioned embodiments, and all or some of the aforementioned embodiments may selectively be configured in combination so that various modifications may be made in the aforementioned embodiments.

Meanwhile, the operation method of the digital device disclosed in this specification may be implemented in a recording medium, which may be read by a processor provided in the digital device, as a code that can be read by the processor. The recording medium that can be read by the processor includes all kinds of recording media in which data that can be read by the processor are stored. Examples of the recording medium include a ROM, a RAM, a CD-ROM, a magnetic tape, a floppy disk, and an optical data memory. Also, another example of the recording medium may be implemented in a shape of carrier wave such as transmission through Internet. Also, the recording medium that can be read by the processor may be distributed in a computer system connected thereto through a network, whereby codes that can be read by the processor may be stored and implemented in a distributive mode.

It will be apparent to those skilled in the art that the present specification can be embodied in other specific forms without departing from the spirit and essential characteristics of the specification. Thus, the above embodiments are to be considered in all respects as illustrative and not restrictive. The scope of the specification should be determined by reasonable interpretation of the appended claims and all change which comes within the equivalent scope of the specification are included in the scope of the specification.

What is claimed is:

1. A digital device comprising:
   a memory;
   a display;
   a communication unit;
   a controller operably coupled to the memory, the display, and the communication unit and configured to:
   receive a first control signal via the communication unit while a screen of the display is turned off;
   connect the digital device with a plurality of operation devices in accordance with the first control signal;
   receive data from the connected plurality of operation devices via the communication unit;
   cause the display to display a first user interface including an indicator for a first operation device of the plurality of operation devices on a first area of the screen with reference to the received data; and
   cause the display to display a second user interface for controlling a second operation device of the plurality of operation devices on a second area of the screen in response to dragging of the first user interface from the first area to the second area on the screen.

2. The digital device according to claim 1, wherein the first control signal is generated by a touch input of a user.

3. The digital device according to claim 1, wherein the first control signal is automatically generated by the digital device in accordance with a predetermined condition comprising movement of the digital device or a voice input, and the first control signal is automatically received by the controller.

4. The digital device according to claim 1, wherein, the controller is further configured to:
   receive movement data of the digital device;
   control a third user interface to edit the indicator for the first operation device included in the first user interface based on the movement data and heading direction data of the digital device based on the movement data; and
   cause the display to display the third user interface on the screen.

5. The digital device according to claim 1, wherein the controller is further configured to:
   map data on a network to which the digital device belongs; and cause the display to display the map data on the screen.

6. The digital device according to claim 5, wherein the controller is further configured to cause the display to display an indicator for an operation device which belongs to a corresponding position on each data area of the map data displayed on the screen.

7. The digital device according to claim 6, wherein the controller is further configured to cause the communication unit to transmit an operation control signal for the operation device which belongs to the data area or transmit an operation control signal for the data area.

8. The digital device according to claim 1, wherein the controller is further configured to edit the first user interface or at least one indicator within the first user interface in accordance with a movement or an input signal of the digital device.

* * * * *